(12) United States Patent
Lopes et al.

(10) Patent No.: US 11,416,867 B2
(45) Date of Patent: Aug. 16, 2022

(54) MACHINE LEARNING SYSTEM FOR TRANSACTION RECONCILIATION

(71) Applicant: Accenture Global Solutions Limited, Dublin (IE)

(72) Inventors: Maria Lopes, Mumbai (IN); Gopali Raval Contractor, Mumbai (IN); Subhashini Lakshminarayanan, Chennai (IN); Prasanna S R, Bengaluru (IN); Parag Rane, Thane (IN); Arati Deo, Bengaluru (IN); Azimullah Shahzad, Bihar (IN); Vallinath Sriramula, Guntur (IN)

(73) Assignee: Accenture Global Solutions Limited, Dublin (IE)

( * ) Notice: Subject to any disclaimer, the term of this patent is extended or adjusted under 35 U.S.C. 154(b) by 63 days.

(21) Appl. No.: 16/906,044

(22) Filed: Jun. 19, 2020

(65) Prior Publication Data

US 2021/0350382 A1    Nov. 11, 2021

(30) Foreign Application Priority Data

May 6, 2020    (IN) .............................. 202041019280

(51) Int. Cl.
*G06Q 40/00* (2012.01)
*G06Q 20/40* (2012.01)
(Continued)

(52) U.S. Cl.
CPC ......... *G06Q 20/4093* (2013.01); *G06N 3/049* (2013.01); *G06Q 20/425* (2013.01)

(58) Field of Classification Search
CPC .. G06Q 20/10; G06Q 20/4016; G06Q 20/085; G06N 5/04; G06N 20/00
See application file for complete search history.

(56) References Cited

U.S. PATENT DOCUMENTS 10,650,432 B1 *  5/2020  Joseph ..................... G06N 3/08
10,705,796 B1 *  7/2020  Doyle ..................... G06N 5/003
(Continued)

OTHER PUBLICATIONS

Doan, AnHai (Reconciling Schemas of Disparate Data Sources: A Machine Learning Approach, University of Washington; See p. 1 paragraph 1; https://homes.cs.washington.edu/~pedrod/papers/sigmod01.pdf, 2001) (Year: 2001).*

*Primary Examiner* — Elizabeth H Rosen
*Assistant Examiner* — Mark H Gaw
(74) *Attorney, Agent, or Firm* — Harrity & Harrity, LLP

(57) ABSTRACT

A device may receive transaction data associated with transactions. The transaction data may be associated with transaction entries that are associated with the transactions. The device may process, using a matching model, the transaction entries to classify the transaction entries into a set of matched transaction entries and a set of unmatched transaction entries. The device may update a transaction grouping model based on the set of matched transaction entries to create an updated transaction grouping model. The device may determine, using the updated transaction grouping model, that a subset of the set of unmatched transaction entries are associated with a same transaction. The device may classify the subset of the set of unmatched transaction entries as grouped transaction entries. The device may provide an indication that the grouped transaction entries and the set of matched transaction entries are reconciled transactions.

20 Claims, 13 Drawing Sheets

(51) Int. Cl.
*G06Q 20/42* (2012.01)
*G06N 3/04* (2006.01)

(56) References Cited

U.S. PATENT DOCUMENTS

| | | | |
|---|---|---|---|
| 2015/0324715 A1* | 11/2015 | Nelson | G06Q 10/0635 |
| | | | 705/7.28 |
| 2017/0372317 A1* | 12/2017 | Wang | G06Q 20/10 |
| 2019/0073647 A1* | 3/2019 | Zoldi | G06Q 20/383 |
| 2019/0102244 A1* | 4/2019 | Tarlano | G06F 11/0787 |
| 2020/0111099 A1* | 4/2020 | Benkreira | G07F 19/211 |

* cited by examiner

Transaction Data
205

| Index | Month ID | RECORD | ACCOUNT NUMBER | SITE | AMOUNT | CCY | VALUE DATE | ENTRY DATE | REF1 | REF2 | REF3 | REF4 |
|---|---|---|---|---|---|---|---|---|---|---|---|---|
| 0 | 123478464001 | BR426601 | BZ121213 | 1 | 9369941 | USD | 8/12/2019 | 8/12/2019 | | YYN23463 MATU | | 3110311B RATE YYN23463 |
| 1 | 123780690001 | BR426601 | BZ121213 | S | 500020 | USD | 8/12/2019 | 8/12/2019 | | | BR1X00000RECON 58000002BR | MX100000RECON 58000002BR |
| 2 | 123780690001 | BR426601 | BZ121213 | S | -20084 | USD | 8/14/2019 | 8/14/2019 | 1221409P0R | INTERNATIONAL BUS MATURITY PROCEEDS | PA / PFTB1148 000000001M4 |
| 3 | 123780690001 | BR426601 | BZ121213 | S | 50301 | USD | 8/12/2019 | 8/12/2019 | | | | 002065141 SELL BVV2205 10K |
| 4 | 123780690001 | BR426601 | BZ121213 | S | 40301 | USD | 8/9/2019 | 8/9/2019 | | PLRS MARCARA GERM | A3L INDRA LTD A/C ABC INDIA LTD. PLEASE EXECUTE |
| 5 | 123780690001 | BR426601 | BZ121213 | S | -10001 | USD | 8/14/2019 | 8/14/2019 | | | | 00223612 XXXBNK BANK CH |
| 6 | | BR426102 | BZ121213 | S | 2351.32 | USD | 8/9/2019 | 8/9/2019 | | SKKFJSD PQ3ST | | 11223344 POSST KATUSD PE |
| 7 | | BR426102 | BZ121213 | S | 1351.32 | USD | 8/9/2019 V82105141 | 8/9/2019 | EKPENSE EXP | | 11223344 EXP EXPENSE JKKD |
| 8 | | BR426102 | BZ121213 | S | 1006.02 | USD | 8/9/2019 V82105141 | 8/9/2019 | EKPENSE EXP | | 11223344 EXP EXPENSE JKKD |
| 9 | | BR426102 | BZ121213 | S | 2351.32 | USD | 8/12/2019 | 8/12/2019 | XYZ6QR2 ABVNYO | | 002030304 ABWEXP XYZPQ |
| 10 | | BR426102 | BZ121213 | S | 2351.32 | USD | 8/12/2019 | 8/12/2019 | XYZ6QR2 ABONYO | | 002035632 ABONYO XYZPQ |
| 11 | | BR406102 | BZ121213 | S | 1006.02 | USD | 8/14/2019 | 8/14/2019 | 22211233 AGNYO | | 00228G644 ABNYO 22112233 |

{ 210
{ 215

200

FIG. 2A

MACHINE LEARNING SYSTEM FOR TRANSACTION RECONCILIATION

CROSS-REFERENCE TO RELATED APPLICATION

This application claims priority to Indian Provisional Application No. 202041019280 entitled, "MACHINE LEARNING SYSTEM FOR TRANSACTION RECONCILIATION," filed on May 6, 2020. The entire content of which is expressly incorporated herein by reference.

BACKGROUND

Trade reconciliation is a process for comparing two sets of records to verify that transactions are correct, consistent, and accurate across the records. Reconciliation can be used to ensure that money or an investment vehicle (e.g., stocks, bonds, option, futures, and/or the like) leaving an account matches the actual money spent. This can be done by verifying that different sets of accounting records match.

SUMMARY

According to some implementations, a method may include receiving, by a device, transaction data that is associated with transaction entries, wherein the transaction entries identify information associated with a plurality of transactions; processing, by the device and using a matching model, the transaction entries to classify the transaction entries into a set of matched transaction entries and a set of unmatched transaction entries; analyzing, by the device, the set of matched transaction entries to identify a feature that is associated with a subset of transaction entries, of the set of matched transaction entries, that are associated with a same transaction; updating, by the device, a transaction grouping model based on feature information, that is associated with the feature, to create an updated transaction grouping model, wherein the transaction grouping model is trained based on historical transaction data associated with a plurality of previous transactions; analyzing, by the device and using the updated transaction grouping model, the set of unmatched transaction entries to group the set of unmatched transaction entries based on probabilities that individual unmatched transaction entries are associated with a same transaction; classifying, by the device, grouped transaction entries, of the set of unmatched transaction entries, and the set of matched transaction entries as reconciled transactions; determining, by the device, that an ungrouped transaction entry, of the set of unmatched transaction entries, is associated with missing transaction data that is associated with a transaction; and performing, by the device, an action associated with the missing transaction data or reconciled transaction data associated with the reconciled transactions.

According to some implementations, a device may include one or more memories and one or more processors. In some implementations, the one or more processors are communicatively coupled to the one or more memories. The one or more processors may be configured to: receive transaction data associated with a plurality of transactions, wherein the transaction data is associated with transaction entries that are associated with the plurality of transactions; process, using a matching model, the transaction entries to classify the transaction entries into a set of matched transaction entries and a set of unmatched transaction entries; update a transaction grouping model based on the set of matched transaction entries to create an updated transaction grouping model, wherein the transaction grouping model is trained based on historical transaction data associated with a plurality of previous transactions; determining, using the updated transaction grouping model, that a subset of the set of unmatched transaction entries are associated with a same transaction; classify the subset of the set of unmatched transaction entries as grouped transaction entries; and provide an indication that the grouped transaction entries and the set of matched transaction entries are reconciled transactions.

According to some implementations, a non-transitory computer-readable medium may store one or more instructions. The one or more instructions, when executed by one or more processors of a device, may cause the one or more processors and/or the device to: obtain a set of matched transaction entries and a set of unmatched transaction entries that are associated with transaction data, wherein the transaction data is associated with a plurality of transactions; analyze the set of matched transaction entries to identify a feature that is associated with a subset of transaction entries, of the set of matched transaction entries, that are associated with a same transaction; train a transaction grouping model based on feature information that is associated with the feature, wherein the transaction grouping model is trained to group unmatched transaction entries, of the set of unmatched transaction entries, based on a probability that subsets of the set of unmatched transaction entries are associated with a same transaction, and wherein the transaction grouping model was previously trained based on historical transaction data associated with a plurality of previous transactions; classify, using the transaction model, the set of unmatched transaction entries into grouped transaction entries and ungrouped transaction entries; and provide a reconciled transaction notification that identifies that the grouped transaction entries and the set of matched transaction entries are reconciled and an unreconciled transaction notification that identifies that the ungrouped transaction entries are likely associated with sets of missing transaction data.

BRIEF DESCRIPTION OF THE DRAWINGS

FIGS. 2A-2E are diagrams of another example implementation described herein.

DETAILED DESCRIPTION

The following detailed description of example implementations refers to the accompanying drawings. The same reference numbers in different drawings may identify the same or similar elements.

Transaction reconciliation is a process for comparing two sets of records (e.g., that include transaction entries) to verify that transactions are correct, consistent, and accurate across the records. In an investing context, transaction reconciliation is sometimes referred to as trade reconciliation. Trade reconciliation may include some automated activity to automatically match transaction entries and some manual activity related to identifying and/or resolving trade breaks for transaction entries that could not be automatically matched. A trade break (e.g., an error, failure, and/or the like) can occur for many reasons, such as delayed recording of a transaction entry, a purchase order that is split into multiple purchases for execution, mismatched prices or amounts, insufficient funds, input errors, and/or the like.

The process of resolving trade breaks and/or matching transaction entries that could not be automatically matched is time-consuming, error prone, and can involve many exchanges of information that is wasteful of computing resources and network resources. The process can also be haphazard and may result in erroneous transaction entries. A transaction reconciliation system described herein uses machine learning to enable more transaction entries to be automatically matched (and more transactions to be automatically reconciled) compared to prior techniques. The transaction reconciliation system also enables greater accuracy in transaction reconciliation by analyzing a greater quantity of data points associated with transaction entries than could be analyzed manually. The transaction reconciliation system can be used for tens, hundreds, thousands, millions, or more transactions to quickly and accurately reconcile those transactions with fewer errors, using fewer resources (e.g., due to automatically reconciling transactions that were unable to be reconciled automatically according to prior techniques, resulting in fewer transactions that need to be manually reconciled), in less time, and with loss risk of lost funds or lost data.

Figure 1:
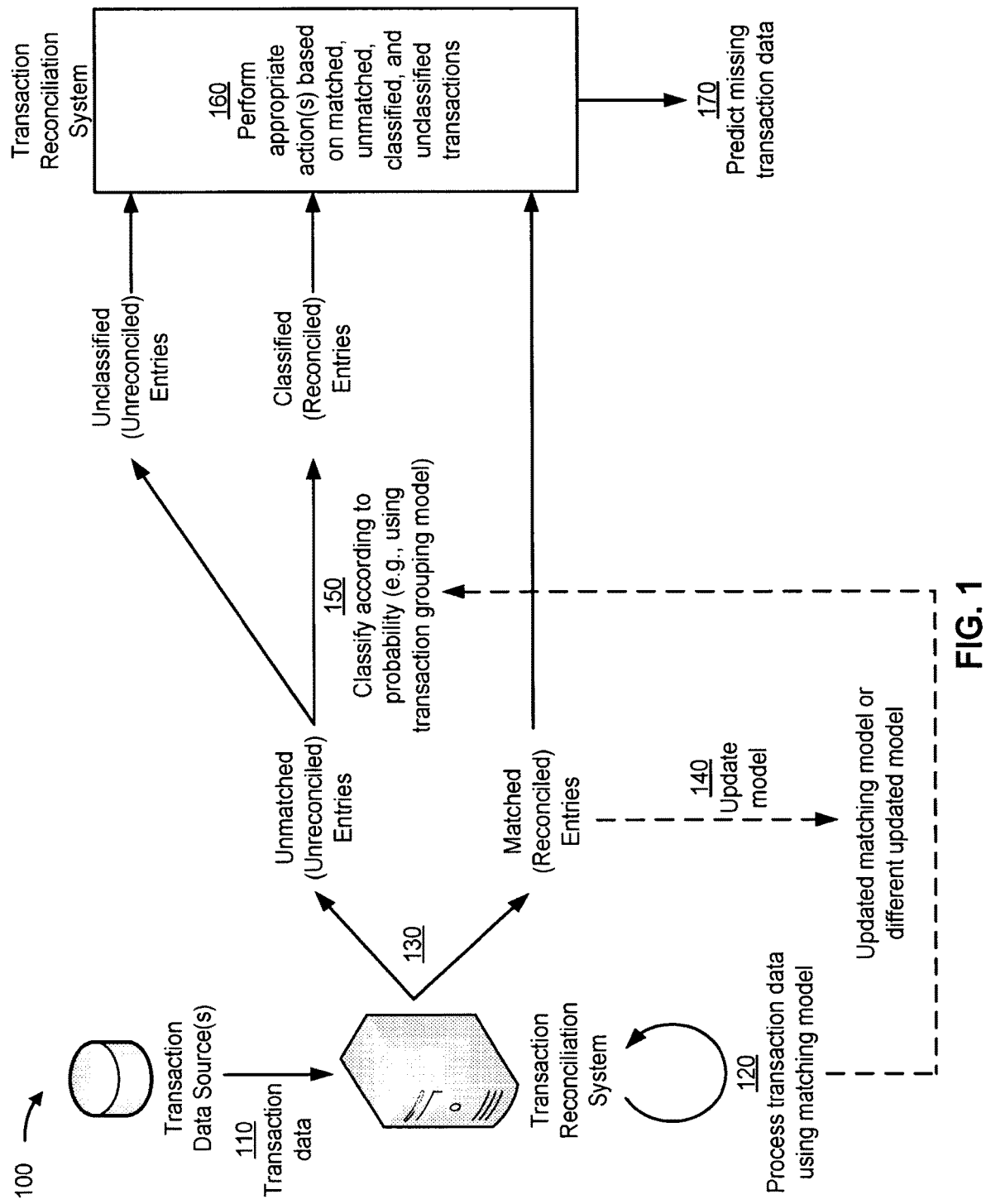
FIG. 1 is a diagram of an example implementation described herein.

FIG. 1 is a diagram of an example 100 associated with transaction reconciliation using a machine learning system. As shown in FIG. 1, example 100 includes one or more transaction data sources and a transaction reconciliation system.

As shown by reference number 110, the transaction reconciliation system may receive transaction data from one or more transaction data sources. The transaction data may include, for example, records (e.g., transaction records) that include transaction entries associated with multiple transactions. In an investing context, the transaction data may include transaction entries that indicate a purchase or sale of an investment vehicle, such as a stock, a bond, a fund (e.g., a mutual fund, an index fund, an exchange-traded fund (ETF), and/or the like), or a contract (e.g., an option contract, a futures contract, and/or the like), among other examples. A transaction entry may include or indicate an entry index, one or more identifiers, one or more account numbers, an indication of a party or side of a transaction (e.g., a ledger side or a statement side), a transaction amount, a transaction currency, one or more dates (e.g., a transaction date or an entry date, among other examples), and/or one or more reference values or notes, among other examples. Additional details regarding transaction entries are described below in connection with FIGS. 2A-2E.

In some implementations, the transaction reconciliation system may receive transaction data from data sources and/or from multiple records. For example, a first data source or a first record may provide or include buy-side transaction data or statement data, and a second data source or a second record may provide or include sell-side transaction data or ledger data. In some cases, different records (e.g., for different sides or parties to a transaction) may be stored in different transaction data sources (e.g., associated with different financial institutions), and the transaction reconciliation system may receive the records from multiple different data sources. Alternatively, different records may be stored in the same transaction data source (with potentially different identifiers associated with different records), and the transaction reconciliation system may receive the records from the same data source. In some implementations, the transaction reconciliation system may receive or obtain the transaction data from the data source(s) according to a schedule, such as once per minute, once per hour, once per day, or once per week, among other examples. In some implementations, the transaction reconciliation system may receive transaction data from the data source(s) in real-time, where a transaction entry is provided to the transaction reconciliation system upon the transaction entry being input to a data source (e.g., immediately after input or within a threshold amount of time after input).

As shown by reference number 120, the transaction reconciliation system may process the transaction data using a matching model. The matching model may be a trained machine learning model, such as a long short-term memory (LSTM) machine learning model, a recurrent neural network (RNN) machine learning model, a graph-based machine learning model, a Louvain model, and/or the like. The matching model may be trained using historical transaction data, as described below in connection with FIG. 3. Alternatively, the matching model may be a rules-based model or another model that is not a machine learning model.

As shown by reference number 130, as a result of processing the transaction data using the matching model, the transaction reconciliation system may classify transaction entries into a set of matched transaction entries and a set of unmatched transaction entries. The matching model used to process the transaction data and classify transaction entries into the set of matched transaction entries and the set of unmatched transaction entries may be referred to herein as an original matching model to differentiate from a matching model that has been retrained by the transaction reconciliation system, as described in more detail below. In some implementations, rather than processing the transaction data to classify transaction entries into a set of matched transaction entries and a set of unmatched transaction entries, the transaction reconciliation system may receive the set of matched transaction entries and the set of unmatched transaction entries (e.g., that have been generated due to processing by another device).

The set of matched transaction entries may be associated with reconciled transactions. For example, a group of transaction entries (within the set of matched transaction entries) may be matched with one another and may correspond to a transaction that has been reconciled due to the matching of the group of transaction entries. The set of matched transaction entries may include one or more groups of transaction entries that each correspond to a different reconciled transaction. In some implementations, the transaction reconciliation system may generate a match identifier for a transaction and may associate the match identifier with all of the transaction entries associated with that transaction. For example, the transaction reconciliation system may store the match identifier in a data structure in association with each transaction entry associated with the transaction, such as by adding a match identifier value to a match identifier field for the entry. Different match identifiers may correspond to different transactions (e.g., different reconciled transactions). Thus, a transaction entry with a value for a match identifier field corresponds to reconciled transaction, while a transaction entry without a value (or with a null value, a zero value, an empty value, or a similar value indicating that the transaction entry has not been matched) for the match identifier filed corresponds to an unreconciled transaction.

In some implementations, the transaction reconciliation system (e.g., the matching model) may determine that a group of transaction entries are associated with the same transaction based on transaction values included in transaction data for the group of transaction entries. For example, if a sum of all of the transaction values for the group of transaction entries equals zero, then this may indicate that the group of transaction entries is associated with the same transaction. Additionally, or alternatively, the transaction reconciliation system may determine that a group of transaction entries are associated with the same transaction based on times or timestamps included in transaction data for the group of transaction entries. For example, if the times occur within a threshold amount of time of one another, then this may indicate that the group of transaction entries is associated with the same transaction. Additionally, or alternatively, the transaction reconciliation system may determine that a group of transaction entries are associated with the same transaction based on entity information included in transaction data for the group of transaction entries. For example, if the entity information indicates that the group of transaction entries are associated with the same entity (e.g., a same purchasing entity, a same selling entity, a same financial institution, and/or the like), then this may indicate that the group of transaction entries is associated with the same transaction.

In some cases, processing the transaction data using the matching model may result in a set of unmatched transaction entries. The set of unmatched transaction entries may include transaction entries for which matching entries could not be identified by the matching model to reconcile a corresponding transaction. The matching model may be unable to match such transaction entries for a variety of reasons, including transaction amounts (e.g., credits and debits) that do not match or offset one another, unrecorded transactions (e.g., small interest payments), incorrect transaction data into a record (e.g., due to input error), delays in inputting transaction data in a record, incomplete transactions, trade breaks, and/or the like. As a result, one or more transactions may remain unreconciled. Using the techniques described below, the transaction reconciliation system can reconcile some or all of these transactions with greater accuracy, using fewer resources, and in less time than prior techniques.

As shown by reference number 140, in some implementations, the transaction reconciliation system may update the matching model (e.g., the original matching model) using information (e.g., transaction data or a subset of transaction data) from the set of matched entries. For example, the transaction reconciliation system may identify a feature associated with a group of matched transaction entries that correspond to the same transaction (e.g., a group of transaction entries with a same match identifier value). Based on identifying the feature, the transaction reconciliation system may input feature information, associated with the feature, into the original matching model to retrain the original matching model. In some implementations, the feature may be a feature that was included in a feature set used by the original matching model to generate the set of matched entries and the set of unmatched entries. In this case, the transaction reconciliation system may retrain the original matching model using one or more feature values, for the feature, that were not used by the original matching model to generate the set of matched entries and the set of unmatched entries.

Additionally, or alternatively, the feature identified by the transaction reconciliation system may be a feature that was not included in a feature set used by the original matching model to generate the set of matched entries and the set of unmatched entries. In this case, the transaction reconciliation system may retrain the original matching model using the identified feature and one or more feature values for the identified feature. Additionally, or alternatively, the feature information may include a keyword co-occurrence matrix, as described in more detail elsewhere herein. Thus, the feature information may include a feature, one or more feature values for the feature, and/or a metric associated with a feature and/or one or more feature values (e.g., a co-occurrence matrix for feature values). In some implementations, the feature information may include multiple features and corresponding feature values. Additional details regarding features, feature sets, feature values, and training (and retraining) a machine learning model are described below in connection with FIG. 3.

The transaction reconciliation system may identify the feature information using a single group of transaction entries associated with a single transaction or using multiple groups of transaction entries corresponding to multiple transactions. In some implementations, the transaction reconciliation system may identify the feature information based on determining that a threshold quantity or a threshold percentage of transactions, reconciled according to the set of matched entries, include a feature and/or a feature value.

Although operations are described above in connection with updating the original matching model used to generate the set of matched entries and the set of unmatched entries, the transaction reconciliation system may additionally or alternatively update a different model. For example, in some implementations, the transaction reconciliation system may use a first model (referred to above as a matching model) to generate the set of matched entries and the set of unmatched entries, and may use a second model (that is not an updated or retrained version of the first model) to further classify the set of unmatched entries. In some cases, the first model may be less resource intensive (e.g., may include a smaller feature set, may require fewer memory and/or processing resources to execute, and/or the like) than the second model. In this case, device resources may be conserved by using a less resource intensive model to perform initial classification of transaction data into matched and unmatched entries, and then using a more intensive model only for those entries that could not be matched by the first model. In some implementations, the first model (e.g., the matching model) is not a machine learning model, and the second model is a machine learning model. In some implementations, both the first model and the second model are machine learning models.

Alternatively, the transaction reconciliation system may use a first machine learning model (referred to above as a matching model) to generate the set of matched entries and the set of unmatched entries, and may use an updated or retrained version of the first machine learning model to further classify the set of unmatched entries. In either case, the model (e.g., the machine learning model) used to further process and/or classify the set of unmatched entries may be referred to as a transaction grouping model. Thus, the transaction grouping model may be an updated or retrained version of the first model or may be a second model that is a distinct model from the first model and that is not generated by updating or retraining the first model. The transaction grouping model may be a trained machine learning model, such as an LSTM machine learning model, an RNN machine learning model, a graph-based machine learning model, a Louvain model, and/or the like.

As shown by reference number 150, the transaction reconciliation system may use the transaction grouping model to classify (e.g., group) all or a portion of the set of unmatched transaction entries. In some implementations, the transaction grouping model may use probabilities to classify the set of unmatched transaction entries. For example, the transaction grouping model may classify the set of unmatched transaction entries into clusters (e.g., groups) that include transaction entries with a high likelihood (e.g., satisfying a threshold) of being associated with one another as part of the same transaction. As a result of classifying the set of unmatched transaction entries using the transaction grouping model, the transaction reconciliation system may generate a set of classified transaction entries (sometimes referred to as a set of grouped transaction entries). Additionally, or alternatively, the transaction reconciliation system may generate a set of unclassified transaction entries (sometimes referred to as a set of ungrouped transaction entries) as a result of classifying the set of unmatched transaction entries using the transaction grouping model.

The set of classified transaction entries may be associated with reconciled transactions (or transactions that are reconciled with a threshold degree of probability). For example, the transaction reconciliation system may determine a probability that a group of transaction entries (within the set of unmatched transaction entries) are associated with one another. In some cases, this probability may be referred to as and/or may be represented by a confidence score. The transaction reconciliation system may apply the transaction grouping model (e.g., a machine learning model) to calculate probabilities for different groups of transaction entries and/or to create clusters of transaction entries. In some implementations, the transaction reconciliation system may cluster transaction entries that have a probability, of being associated with one another and/or of being associated with the same transaction, that satisfies a threshold. In some implementations, the transaction reconciliation system may generate a match identifier (as described above) and/or a cluster identifier (e.g., an identifier that is different from a match identifier) for a transaction and may associate the match identifier and/or the cluster identifier with all of the transaction entries associated with that transaction according to the classification, in a similar manner as described above.

In some cases, classifying the set of unmatched transaction entries using the transaction grouping model may result in a set of unclassified transaction entries. The set of unclassified transaction entries may include transaction entries that could not be grouped with other transaction entries to reconcile a corresponding transaction with a threshold degree of probability.

As shown by reference number 160, the transaction reconciliation system may perform one or more actions based on the set of matched entries, the set of unmatched entries, the set of classified entries, and/or the set of unclassified entries. For example, the transaction reconciliation system may mark (e.g., by updating a field of transaction entries, by storing information in memory and/or in a data structure, and/or the like) the classified entries and the matched entries as reconciled. Additionally, or alternatively, the transaction reconciliation system may mark the unclassified entries as unreconciled (or not reconciled). Using the techniques described herein, the transaction reconciliation system may be capable of reconciling more transactions and/or may be capable of reconciling transactions with greater accuracy, using fewer resources, and/or in less time than prior techniques.

In some implementations, the transaction reconciliation system may output information as a result of performing the operations described herein. The output information may include information that identifies transactions, transaction data associated with those transactions (e.g., one or more transaction entries), information that identifies matched transaction entries, information that identifies unmatched transaction entries, information that identifies classified transaction entries, information that identifies unclassified transaction entries, information that identifies reconciled transactions (and, in some cases, whether those transactions were reconciled according to matching or classification), information that identifies unreconciled transactions, and/or the like. The transaction reconciliation system may output the information for display (e.g., if the transaction reconciliation system is connected to and/or in communication with a display) or may output the information to another device (e.g., a user device) for storage and/or display by that device. This may permit a user to take appropriate action in some cases. For example, a user may perform additional investigation of unclassified transaction entries.

In some implementations, the transaction reconciliation system may output a request for confirmation of reconciled transactions (e.g., only reconciled transactions associated with matched transaction entries, reconciled transactions associated with classified transaction entries, or both reconciled transactions associated with matched transaction entries and reconciled transactions associated with classified transaction entries). The request may be provided for display by the transaction reconciliation system or by another device in communication with the transaction reconciliation system. A user may review the reconciled transactions, and may confirm or reject the reconciled transactions. If the user provides input confirming the reconciled transactions, the transaction reconciliation system may update a data structure to mark the transactions as reconciled, to include predicted transaction data, and/or the like, as described elsewhere herein. If the user provides input rejecting the reconciled transactions, then the user may be prompted to input information that identifies reconciled transactions, transaction entries associated with a reconciled transaction, missing transaction data, and/or the like. In some implementations, the transaction reconciliation system may retrain a model (e.g., a matching model, a transaction grouping model, and/or the like) based on the input information.

As another example of an action, and as shown by reference number 170, in some implementations, the transaction reconciliation system may predict missing transaction data (e.g., transaction data that is missing from a transaction record). For example, the transaction reconciliation system may determine that an unclassified transaction entry is missing transaction data (e.g., one or more fields of the entry). Additionally, or alternatively, the transaction reconciliation system may infer that a transaction entry is missing from a transaction record. In some implementations, the transaction reconciliation system may output information that identifies the transaction entry predicted to be associated with the missing transaction and/or may output information that indicates an inference of a missing transaction entry.

In some implementations, the transaction reconciliation system may output information that indicates predicted transaction data (e.g., one or more predicted values for one or more fields) for missing transaction data and/or for a missing transaction entry. For example, the transaction reconciliation system may predict one or more features for a transaction entry (which may correspond to a transaction entry field and/or a portion of a transaction entry field). Example features are described elsewhere herein.

In some implementations, the transaction reconciliation system may update a transaction record with the predicted transaction data. For example, the transaction reconciliation system may update one or more fields of a transaction entry to include the predicted transaction data, may update information stored in memory and/or in a data structure, may transmit the predicted transaction data to a transaction data source and instruct the transaction data source to update the transaction record, and/or the like. In some implementations, the transaction reconciliation system may flag the predicted transaction data for further review. Additionally, or alternatively, the transaction reconciliation system may search a transaction record for the transaction entry.

In some implementations, the transaction reconciliation system may receive a transaction record at a later time (e.g., the next day), and may search the transaction record for the predicted transaction data and/or the missing transaction entry. If the transaction reconciliation system finds such a transaction entry (e.g., with the predicted transaction data), then the transaction reconciliation system may group the transaction entry with the other transaction entries associated with the transaction. In this case, the transaction reconciliation system may reconcile the transaction. Additionally, or alternatively, the transaction reconciliation system may query (e.g., submit a request to) a transaction data source to obtain one or more transaction entries having the characteristic. In some implementations, the transaction reconciliation system may identify a transaction data source to be queried based on the characteristics and/or based on transaction data associated with the transaction having missing transaction data. For example, the transaction reconciliation system may query a first transaction data source for a missing credit, and may query a second transaction data source for a debit.

In this way, the transaction reconciliation system uses machine learning to enable more transaction entries to be automatically matched (and more transactions to be automatically reconciled) compared to prior techniques. The transaction reconciliation system also enables greater accuracy in transaction reconciliation by analyzing a greater quantity of data points associated with transaction entries than could be analyzed manually. The transaction reconciliation system can be used for tens, hundreds, thousands, millions, or more transactions to quickly and accurately reconcile those transactions with fewer errors, using fewer resources (e.g., due to automatically reconciling transactions that were unable to be reconciled automatically according to prior techniques, resulting in fewer transactions that need to be manually reconciled), in less time, and with loss risk of lost funds or lost data.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

FIGS. 2A-2E are diagrams of an example 200 associated with transaction reconciliation using a machine learning system. FIGS. 2A-2E show additional details associated with the operations described above in connection with FIG. 1.

FIG. 2A shows an example of transaction data and classification of a set of transaction entries 205 into a set of matched transaction entries 210 and a set of unmatched transaction entries 215, as described above in connection with reference number 130 of FIG. 1. In FIG. 2A, a row in the illustrated table corresponds to a transaction entry 205 that includes transaction data.

As shown, the transaction data may include an entry index (shown as "Index"). Each transaction entry 205 has a unique entry index to distinguish the transaction entry 205 from other transaction entries 205. As further shown, the transaction data may include one or more identifiers, such as a match identifier (shown as "Match ID"), a reconciliation identifier (shown as "RECONID"), and/or the like. A group of transaction entries 205 may each be assigned with the same match identifier to indicate that the group of transaction entries 205 are associated with the same transaction. Different match identifiers may be used to identify transaction entries 205 that are associated with different transactions. A reconciliation identifier may identify a relationship between two parties executing a transaction. In some implementations, a reconciliation identifier may be associated with multiple transactions (and the transaction entries associated with those transactions).

As further shown, the transaction data may include one or more account identifiers (e.g., that identify an account to which funds have been added or credited, an account from which funds have been subtracted or debited, and/or the like), an indication of a side of a transaction (e.g., a ledger side "L" or a statement side "S"), a transaction amount (which may be positive for credited amounts and negative for debited amounts), a transaction currency (shown as "CCY" in US Dollars), one or more dates (e.g., a transaction date, an entry date, and/or the like), and/or one or more reference values (e.g., notes or other input provided in connection with the entry), among other examples. The reference values may include transaction data that does not fit within one of the other categories, such as notes or free-form text input in connection with a transaction entry, a transaction reference number, an entity identifier or entity information for an entity associated with a transaction entry, a purpose of a transaction, instructions for executing the transaction, a memo associated with the transaction entry, a financial vehicle identifier (e.g., a stock identifier, a security identifier, a security code, and/or the like) associated with a transaction entry, a transaction break code, and/or the like.

In example 200, the set of matched transaction entries 210 includes a first group of transaction entries that includes three transaction entries assigned with a match identifier of 1237806900, and also includes a second group of transaction entries that includes three transaction entries assigned with a match identifier of 1237806901. In example 200, the set of unmatched transaction entries 215 includes six transaction entries that could not be reconciled or matched, and thus have not been assigned with a match identifier. In example 200, these transactions could not be reconciled because respective amounts associated with each transaction entry in the set of unmatched transaction entries 215 do not sum to zero. However, there may be other reasons that transaction entries 205 cannot be reconciled.

Figure 2B:
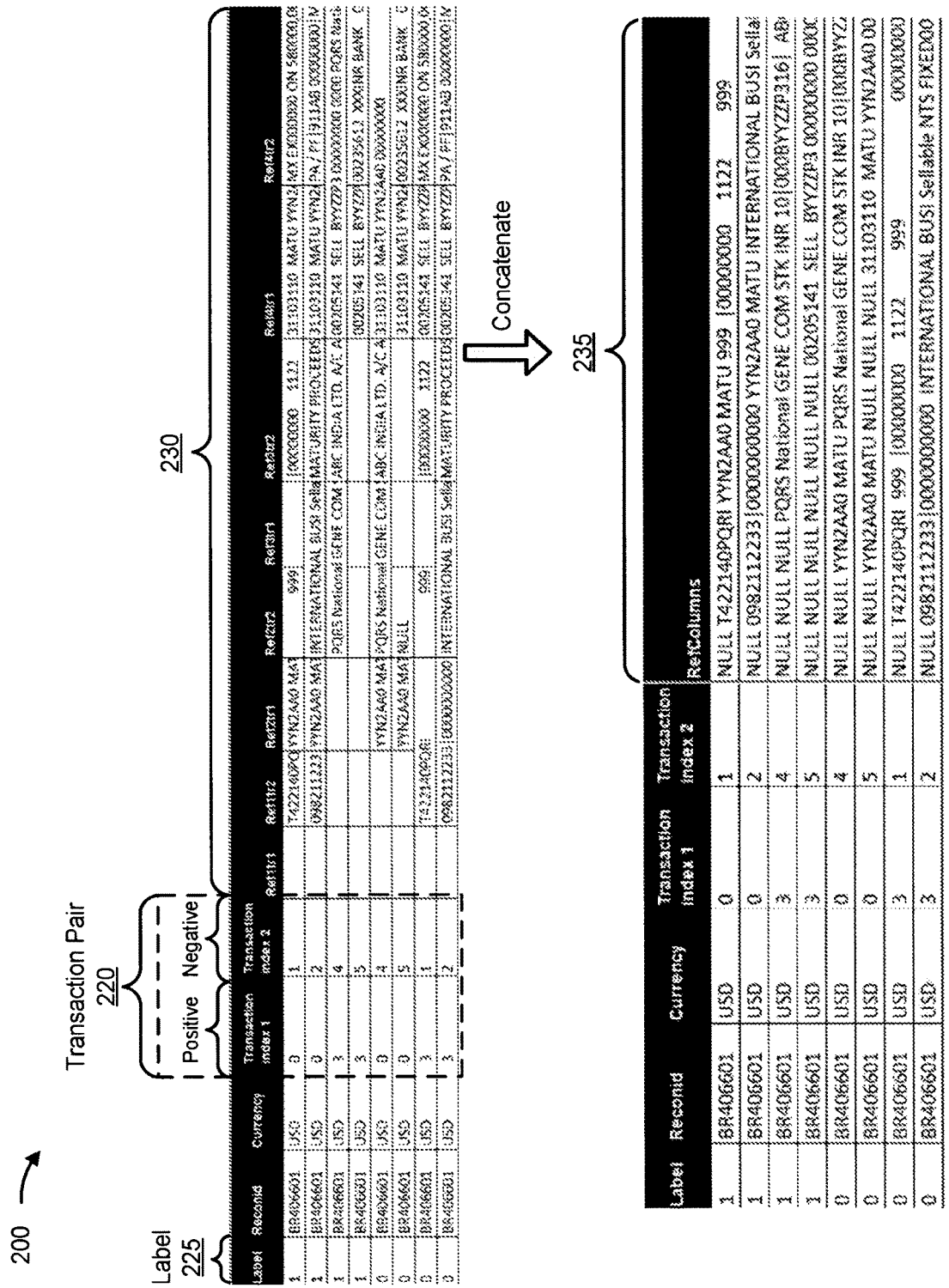

FIG. 2B shows an example of preparing or preprocessing the set of matched transaction entries 210 so that transaction data in the set of matched transaction entries 210 can be used to train and/or update a machine learning model, as described above in connection with reference number 140 of FIG. 1. As shown in FIG. 2B, the transaction reconciliation system may combine pairs of transactions into transaction pairs 220, and may create entries for each transaction pair 220. Each transaction pair 220 may include a positive transaction having a positive transaction amount (e.g., a ledger side transaction) and a negative transaction having a negative transaction amount (e.g., a statement side transaction). In some implementations, the positive transaction amount has a different magnitude (or absolute value) than the negative transaction amount (e.g., the transaction pair need not offset to zero). The transaction reconciliation system may assign a label 225 to each transaction pair 220. A first label (shown as 1) may be used to indicate that a transaction pair 220 belongs to the same transaction (e.g., having the same match identifier), and a second label (shown as 0) may be used to indicate that a transaction pair 220 belongs to a different transaction (e.g., having a different match identifier, but the same reconciliation identifier and/or the same currency because transaction entries associated with different reconciliation identifiers or different currencies are not likely to be associated with one another as part of the same transaction). As shown by reference number 230, the transaction reconciliation system may combine reference values for the two transactions included in the transaction pair 220, and may associate the combined reference values with the transaction pair 220.

As an example, the first entry (row) of the table in FIG. 2B is associated with a positive transaction entry having an index of 0 (e.g., shown in FIG. 2A) and a negative transaction entry having an index of 1. These transaction entries are associated with the same match identifier (shown as 1237806900 in FIG. 2A), and so the transaction reconciliation system has assigned a label of 1 to this transaction pair. These transaction entries are associated with the same reconciliation identifier and the same currency, which the transaction reconciliation system associates with the transaction pair entry. The transaction reconciliation system combines the reference values for this transaction pair, shown as "Ref1tr1" for a first reference value (the "REF1" column in FIG. 2A) of the positive transaction entry, "Ref1tr2" for a first reference value (the "REF1" column in FIG. 2A) of the negative transaction entry, "Ref2tr1" for a second reference value (the "REF2" column in FIG. 2A) of the positive transaction entry, and so on.

As further examples, the second entry of the table in FIG. 2B is associated with a positive transaction entry having an index of 0 and a negative transaction entry having an index of 2, the third entry of the table in FIG. 2B is associated with a positive transaction entry having an index of 3 and a negative transaction entry having an index of 4, the fourth entry of the table in FIG. 2B is associated with a positive transaction entry having an index of 3 and a negative transaction entry having an index of 5, the fifth entry of the table in FIG. 2B is associated with a positive transaction entry having an index of 0 and a negative transaction entry having an index of 4, the sixth entry of the table in FIG. 2B is associated with a positive transaction entry having an index of 0 and a negative transaction entry having an index of 5, the seventh entry of the table in FIG. 2B is associated with a positive transaction entry having an index of 3 and a negative transaction entry having an index of 1, and the eighth entry of the table in FIG. 2B is associated with a positive transaction entry having an index of 3 and a negative transaction entry having an index of 2. The fifth, sixth, seventh, and eighth entries are assigned a label of 0 because these transaction pairs are associated with different match identifiers, and thus belong to different transactions.

As shown by reference number 235, the transaction reconciliation system may further process the transaction pair entries by combining or concatenating all of the reference values for both transaction entries in a transaction pair. In some implementations, the transaction reconciliation system may insert a value of "NULL" or the like for a reference value if a transaction entry does not have a value for the reference value. In some implementations, the transaction reconciliation system may insert a delimiter between reference values that are concatenated (e.g., a space, a vertical bar, or another character or sequence of characters). In some cases, a reference value may already include one or more delimiters (e.g., for a reference value that includes multiple terms or character strings separated by spaces).

By preparing the transaction data in this way, the transaction reconciliation system may improve training of the machine learning model by indicating correct matches (labeled with a 1) and incorrect matches (labeled with a 0). The correct matches may indicate transaction pairs that belong to the same transactions, and the incorrect matches may indicate transaction pairs that belong to different transactions.

Figure 2C:
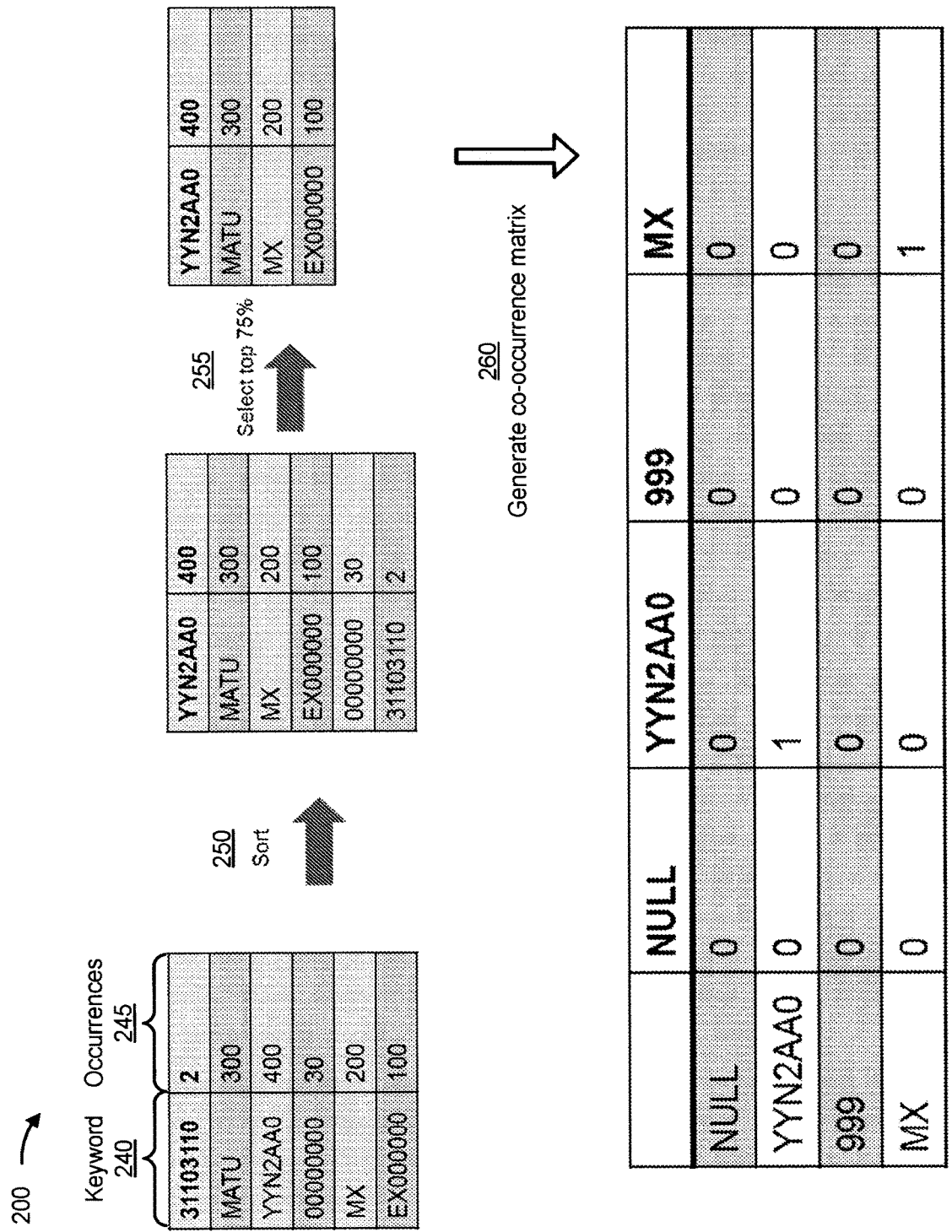

FIG. 2C shows an example of creating a co-occurrence matrix that can be used to train and/or update a machine learning model, as described above in connection with reference number 140 of FIG. 1. The transaction reconciliation system may analyze the concatenated reference values for the set of matched transaction entries 210 from a set of transaction pair entries generated as described above in connection with FIG. 2B. The transaction reconciliation system may extract keywords 240 from the concatenated reference values. In some implementations, the transaction reconciliation system may apply regular expressions to extract the keywords. For example, the transaction reconciliation system may use the delimiters described above to separate keywords. The transaction reconciliation system may count a number of occurrences 245 of each keyword (e.g., across all transaction data, across the set of matched transaction entries 210, across the set of transaction pair entries, and/or the like). As shown in FIG. 2C, the transaction reconciliation system may generate a keyword occurrence table (or matrix) that indicates, for a set of keywords, a keyword 240 and a corresponding number of occurrences 245 of that keyword.

As shown by reference number 250, the transaction reconciliation system may sort the keyword occurrence table according to a number of occurrences of each keyword. For example, the transaction reconciliation system may sort the keyword occurrence table in descending order, according to a number of occurrences, to generate a sorted keyword occurrence table. As shown by reference number 255, the transaction reconciliation system may filter the sorted keyword occurrence table to exclude one or more keywords and corresponding numbers of occurrences. In example 200, the transaction reconciliation system keeps the top 75% of keywords (e.g., the top 75% of keywords with the most occurrences) in the sorted keyword occurrence table and removes the bottom 25% of keywords. These threshold values are provided as an example, and other threshold values may be used, such as 90%, 80%, 60%, or 50%, among other examples.

As shown by reference number 260, the transaction reconciliation system may generate a keyword co-occurrence matrix that includes the keywords that occur more than a threshold number of times (or in more than a threshold percentage of transaction pair entries). The keyword co-occurrence matrix may include values that indicate a relationship between two keywords. The transaction reconciliation system may determine the value based on whether the two keywords occur together within the reference value field of a transaction pair entry, a quantity of times that the two keywords occur together within a reference value field of a transaction pair entry (e.g., for all analyzed transaction pair entries), a percentage of times that the two keywords occur together within a reference value field of a transaction pair entry (e.g., across all analyzed transaction pair entries), and/or the like. For example, a higher value for a pair of keywords may indicate a stronger relationship between the pair of keywords, and a lower value for a pair of keywords may indicate a weaker relationship (or no relationship) between the pair of keywords. In some implementations, the transaction reconciliation system may perform dimensionality reduction to reduce a size of the keyword co-occurrence matrix, such as by performing singular value decomposition on the keyword co-occurrence matrix. This may conserve memory resources used to store the keyword co-occurrence matrix, may reduce processing resources needed to process the keyword co-occurrence matrix, and/or the like.

Figure 2D:
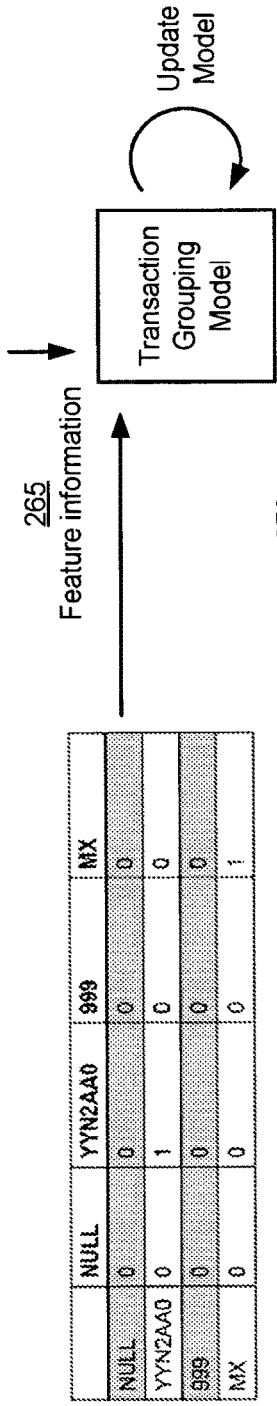

FIG. 2D shows an example of updating a machine learning model using feature information and generating probabilities that pairs of transaction entries belong to the same transaction, as described above in connection with reference numbers 140 and 150 of FIG. 1.

As shown by reference number 265, the transaction reconciliation system may input feature information into the transaction grouping model. As described above in connection with FIG. 1, the feature information may include a feature, one or more feature values for the feature, and/or a metric associated with a feature and/or one or more feature values (e.g., a co-occurrence matrix for feature values). In example 200, the feature information includes a feature of reference values for a transaction pair (e.g., concatenated reference values for the transaction pair, shown as "RefColumns"), includes feature values (e.g., keywords) for that feature for each transaction pair, and includes a co-occurrence matrix for the feature values (e.g., a keyword co-occurrence matrix). This feature information may be used to update or retrain the transaction grouping model, as described in more detail below in connection with FIG. 3.

As shown by reference number 270, the transaction reconciliation system (using the transaction grouping model) may determine probabilities that pairs of transaction entries, from the set of unmatched transaction entries 215 (e.g., shown in FIG. 2A, with index values of 6 through 11) belong to the same transaction. As described elsewhere herein, a pair of transaction entries (or a transaction entry pair) may include a positive transaction entry and a negative transaction entry. As an example, the first entry (row) of the probabilities table in FIG. 2C is associated with a positive transaction entry having an index of 6 (e.g., shown in FIG. 2A) and a negative transaction entry having an index of 7. In example 200, the transaction reconciliation system has determined that these two transaction entries have a 78% probability (e.g., 0.78) of being associated with the same transaction. The transaction reconciliation system may determine this probability based on applying a machine learning model to a feature set, which may include the feature information determined from the set of matched transaction entries 210. Additional details regarding applying the machine learning model to the set of unmatched transaction entries 215 is described in more detail below in connection with FIG. 4.

Figure 2E:
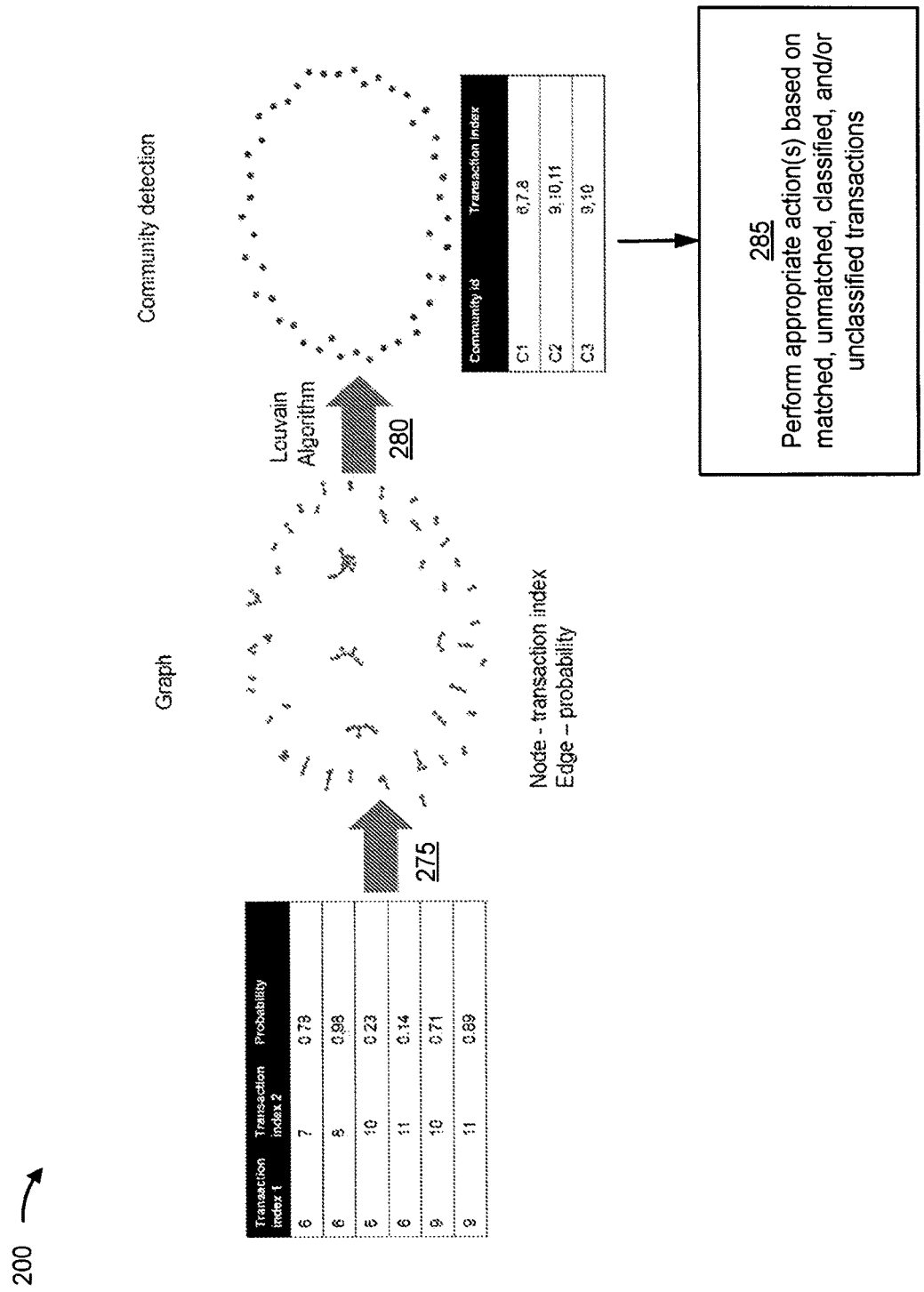

FIG. 2E shows an example of classifying the set of unmatched transaction entries 215 into a set of classified transaction entries, as described above in connection with reference number 150 of FIG. 1. As shown by reference number 275, the transaction reconciliation system may generate a graph based on the probabilities table described above in connection with FIG. 2D. As shown, the graph may include a node for each transaction index. The graph may also include edges that connect pairs of nodes. An edge may be associated with a weight that indicates a strength of a relationship between nodes, which may be equal to or determined based on the probability that a transaction entry pair is associated with the same transaction. Thus, a first node may represent a first transaction entry, a second node may represent a second transaction entry, an edge between the first node and the second node may indicate a relationship between the first transaction entry and the second transaction entry, and a weight associated with the edge may represent a probability that the first transaction entry and the second transaction entry are associated with the same transaction.

As shown by reference number 280, the transaction reconciliation system may classify the set of unmatched transaction entries 215 by creating groups of transaction entries (from the set of unmatched transaction entries 215) that have been determined or estimated to be associated with the same transaction. In some implementations, the transaction reconciliation system may perform a clustering technique (e.g., using a clustering algorithm, a Louvain algorithm, a community detection algorithm, and/or the like) to create the groups (or clusters) of transaction entries. In some implementations, the transaction reconciliation system may use information from the probabilities table and/or the generated graph (or a representation of the generated graph) as input to the clustering technique. In example 200, the transaction reconciliation system determines that transaction entries having indices of 6, 7, and 8 have a threshold probability of being associated with the same transaction, that transaction entries having indices of 9, 10, and 11 have a threshold probability of being associated with the same transaction, and that transaction entries having indices of 10 and 11 have a threshold probability of being associated with the same transaction. Notably, a transaction entry may be included in multiple clusters depending on an output of the machine learning model.

As shown by reference number 285, the transaction reconciliation system may perform one or more actions based on the set of matched entries, the set of unmatched entries, the set of classified entries, and/or the set of unclassified entries, as described above in connection with reference number 160 of FIG. 1. In some implementations, the transaction reconciliation system may perform validation on the set of classified entries, and may perform the one or more actions based on the validation. For example, the transaction reconciliation system may determine a first error metric associated with the set of matched entries, may determine a second error metric associated with the set of classified entries, may compare the two error metrics, and may perform an action based on the comparison. For example, the transaction reconciliation system may perform an action based on a difference between the error metrics, whether the difference satisfies a condition, whether the difference satisfies a threshold, and/or the like. As a specific example, if the second error metric indicates a greater error than the first error metric and/or if the difference between the error metrics satisfies a threshold, then the transaction reconciliation system may predict missing transaction data. In some implementations, the transaction reconciliation system may apply an autoencoder technique to determine the error metric (e.g., using the same autoencoder or different autoencoders to determine the first error metric and the second error metric). The error metric may include a latent layer error metric, a reconstruction error metric, and/or the like. Additionally, or alternatively, the transaction reconciliation system may predict missing data for a transaction if the transaction reconciliation system was unable to reconcile the transaction.

In some implementations, the transaction reconciliation system may predict transaction data that is missing (e.g., from a missing transaction entry), as described above in connection with reference number 170 of FIG. 1. In some implementations, the transaction reconciliation system may use a graph convolutional network or another type of machine learning model to predict missing transaction data. For example, the transaction reconciliation system may assume that a single transaction entity is missing, and may predict transaction data for the missing transaction entity using a graph convolutional network.

In some implementations, the transaction reconciliation system may search a transaction record (e.g., which may be received at a later time, such as the next day or the next week, among other examples) for the predicted transaction data. If the transaction reconciliation system finds the predicted transaction data, then the transaction reconciliation system may add the transaction entry that includes the predicted transaction data to a group associated with a transaction having the missing transaction data, and may reconcile the transaction. In some implementations, the transaction reconciliation system may predict a characteristic associated with the missing transaction data, such as a missing credit, a type of missing credit (e.g., a missing interest payment, a missing dividend payment, and/or the like), an amount of the missing credit, a missing debit, a type of missing debit (e.g., an expense payment, a fee, and/or the like), an amount of the missing debit, and/or the like. The transaction reconciliation system may output information that identifies the characteristic to assist with reconciling the transaction. Additionally, or alternatively, the transaction reconciliation system may search for the characteristic in a transaction record, as described above.

In this way, the transaction reconciliation system uses machine learning to enable more transaction entries to be automatically matched (and more transactions to be automatically reconciled) compared to prior techniques. The transaction reconciliation system also enables greater accuracy in transaction reconciliation by analyzing a greater quantity of data points associated with transaction entries than could be analyzed manually. The transaction reconciliation system can be used for tens, hundreds, thousands, millions, or more transactions to quickly and accurately reconcile those transactions with fewer errors, using fewer resources (e.g., due to automatically reconciling transactions that were unable to be reconciled automatically according to prior techniques, resulting in fewer transactions that need to be manually reconciled), in less time, and with loss risk of lost funds or lost data.

As indicated above, FIGS. 2A-2E are provided as an example. Other examples may differ from what is described with regard to FIGS. 2A-2E. The number and arrangement of devices shown in FIGS. 2A-2E are provided as an example. In practice, there may be additional devices, fewer devices, different devices, or differently arranged than those shown in FIGS. 2A-2E. Furthermore, two or more devices shown in FIGS. 2A-2E may be implemented within a single device, or a single device shown in FIGS. 2A-2E may be implemented as multiple, distributed devices. Additionally, or alternatively, a set of devices (e.g., one or more devices) shown in FIGS. 2A-2E may perform one or more functions described as being performed by another set of devices shown in FIGS. 2A-2E.

Figure 3:
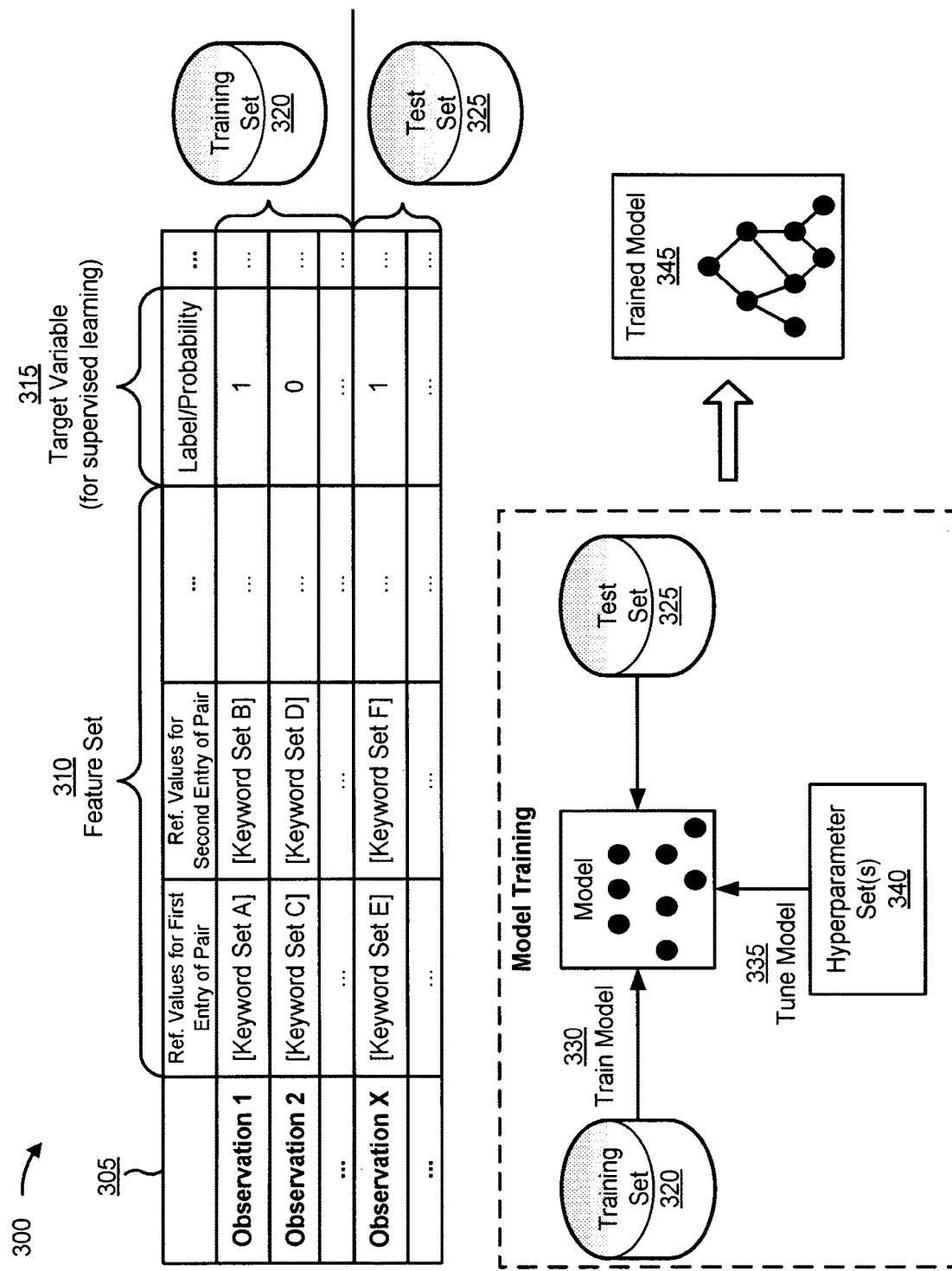
FIG. 3 is a diagram illustrating an example of training a machine learning model in connection with transaction reconciliation.

FIG. 3 is a diagram illustrating an example 300 of training a machine learning model in connection with transaction reconciliation. The machine learning model training described herein may be performed using a machine learning system. The machine learning system may include or may be included in a computing device, a server, a cloud computing environment, and/or the like, such as a transaction reconciliation system 501 described in more detail below.

As shown by reference number 305, a machine learning model may be trained using a set of observations. The set of observations may be obtained and/or input from historical data, such as data gathered during one or more processes described herein. For example, the set of observations may include data gathered from one or more transaction data sources 530, as described elsewhere herein. In some implementations, the machine learning system may receive the set of observations (e.g., as input) from the one or more transaction data sources 530.

As shown by reference number 310, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from one or more transaction data sources 530. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from one or more transaction data sources 530, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of one or more reference values for a first transaction entry of a transaction entry pair (as described elsewhere herein, such as concatenated reference values), a second feature of one or more reference values for a second transaction entry of the transaction entry pair, and so on. In some implementations, an observation may be associated with more than two transaction entries, such as three transaction entries, four transaction entries, and/or the like. Additionally, or alternatively, an observation may be associated with multiple transaction pairs. As shown, for a first observation, the first feature may have a value that includes a set of keywords generated for the first transaction entry (e.g., from the reference values for the first transaction entry), the second feature may have a value that includes a set of keywords generated for the second transaction entry, and so on. These features and feature values are provided as examples, and may differ in other examples. For example, the feature set may include one or more of the following features: a keyword co-occurrence matrix, feature information described elsewhere herein, or any transaction data described elsewhere herein, among other examples. For example, the feature set may include one or more identifiers, one or more account numbers, an indication of a party or side of a transaction (e.g., a ledger side or a statement side), a transaction amount, a transaction currency, one or more dates (e.g., a transaction date or an entry date, among other examples), and/or one or more reference values or notes, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 315, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 300, the target variable is a label that indicates whether a transaction entry pair is associated with the same transaction, which has a value of 1 for the first observation, indicating that the transaction entry pair of the first observation is associated with the same transaction. In some implementations, the target variable may be a score (e.g., in a range of integer values) rather than a binary value. For example, the target variable may be a probability that a transaction entry pair is associated with the same transaction. In example 300, where historical data is used to train the machine learning model, the value of 1 represents a probability of 100% and a value of 0 represents a probability of 0%.

The feature set and target variable described above are provided as examples, and other examples may differ from what is described above. For example, for a target variable of missing transaction data, the feature set may include transaction data for one or more transaction entries, such as transaction data for a group of transactions associated with the same transaction, but for which transaction data is determined to be missing. The historical data may include the transaction data that was missing as the target variable.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit, tune, and/or the like) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used, based on randomly generating hyperparameter values, and/or the like). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups, based on randomly selecting a number of groups, and/or the like) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, closest to a desired threshold, and/or the like) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 345.

As indicated above, FIG. 3 is provided as an example. Other examples may differ from what is described in connection with FIG. 3. For example, the machine learning model may be trained using a different process than what is described in connection with FIG. 3. Additionally, or alternatively, the machine learning model may employ a different machine learning algorithm than what is described in connection with FIG. 3, such as a Bayesian estimation algorithm, a k-nearest neighbor algorithm, an a priori algorithm, a k-means algorithm, a support vector machine algorithm, a neural network algorithm (e.g., a convolutional neural network (CNN) algorithm, a graph CNN algorithm, an RNN algorithm, and/or the like), a deep learning algorithm, an LSTM algorithm, a graph-based algorithm, a Louvain algorithm, and/or the like.

Figure 4:
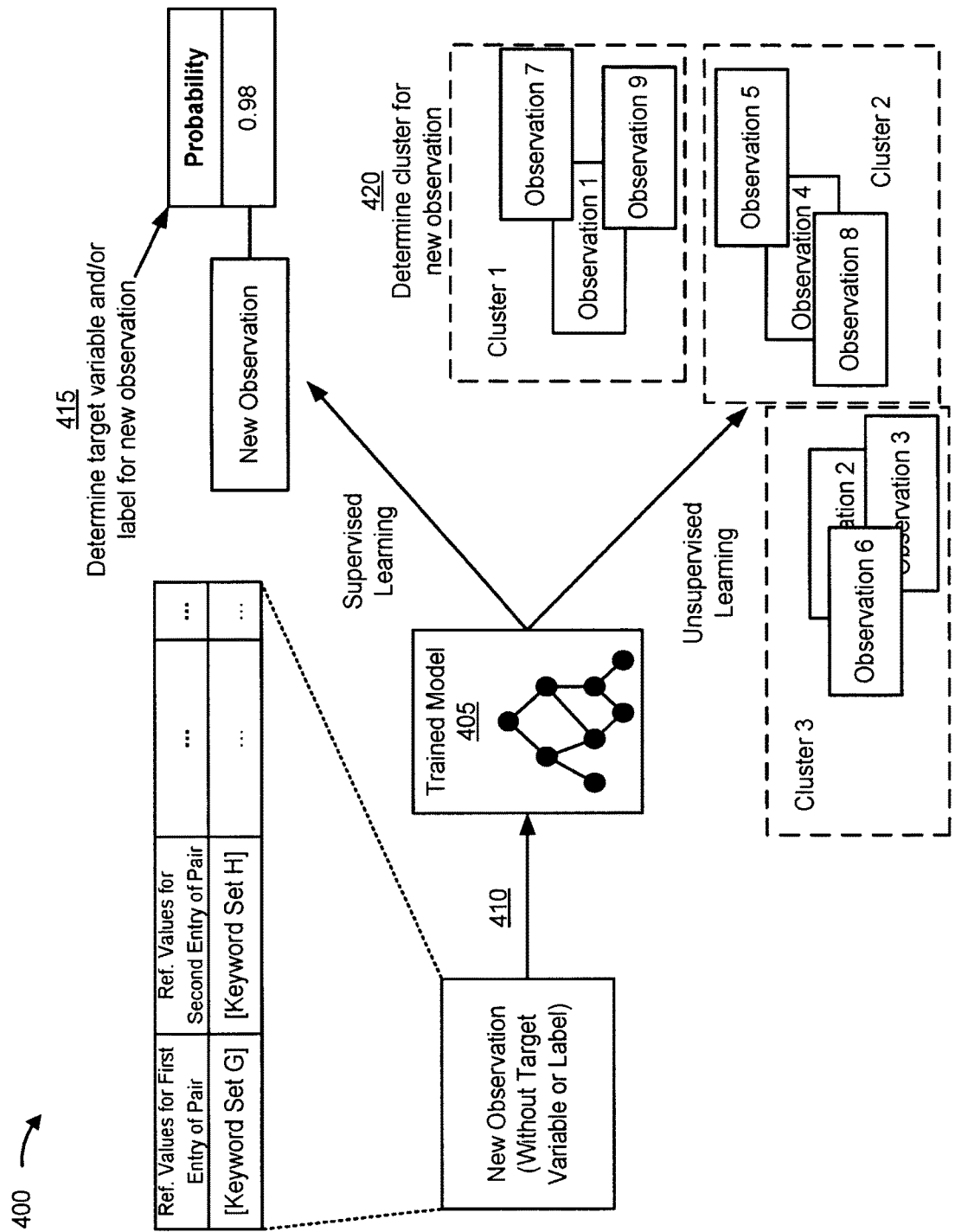
FIG. 4 is a diagram illustrating an example of applying a trained machine learning model to a new observation associated with transaction reconciliation.

FIG. 4 is a diagram illustrating an example 400 of applying a trained machine learning model to a new observation associated with transaction reconciliation. The new observation may be input to a machine learning system that stores a trained machine learning model 405. In some implementations, the trained machine learning model 405 may be the trained machine learning model 345 described above in connection with FIG. 3. The machine learning system may include or may be included in a computing device, a server, a cloud computing environment, and/or the like, such as a transaction reconciliation system 501.

As shown by reference number 410, the machine learning system may receive a new observation (or a set of new observations), and may input the new observation to the machine learning model 405. As shown, the new observation may include a first feature of one or more reference values for a first transaction entry of a transaction entry pair (as described elsewhere herein, such as concatenated reference values), a second feature of one or more reference values for a second transaction entry of the transaction entry pair, and so on, as an example. The machine learning system may apply the trained machine learning model 405 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 405 may predict a value of 0.78 for the target variable of probability (e.g., a probability that the first transaction entry and the second transaction entry are associated with the same transaction) for the new observation, as shown by reference number 415. Based on this prediction (e.g., based on the value having a particular label or classification, based on the value satisfying or failing to satisfy a threshold, and/or the like), the machine learning system may provide a recommendation and/or output for determination of a recommendation, such as a recommendation to mark the first transaction entry and the second transaction entry as being associated with the same transaction, a recommendation to update a transaction record for the first transaction entry and the second transaction entry, and/or the like. Additionally, or alternatively, the machine learning system may perform an automated action and/or may cause an automated action to be performed (e.g., by instructing another device to perform the automated action), such as marking the first transaction entry and the second transaction entry as being associated with the same transaction (e.g., by updating a data structure to assign the same match identifier to the first transaction entry and the second transaction entry), outputting information associated with the first transaction entry and/or the second transaction entry (as described elsewhere herein), outputting a request for confirmation that the first transaction entry and the second transaction entry are associated with the same transaction, retraining the machine learning model (e.g., based on receiving the confirmation), and/or the like. As another example, if the machine learning system were to predict a value of 0.14 for the target variable of probability, then the machine learning system may provide a different recommendation (e.g., a recommendation not to mark the first transaction entry and the second transaction entry as being associated with the same transaction) and/or may perform or cause performance of a different automated action (e.g., refraining from marking the first transaction entry and the second transaction entry as being associated with the same transaction). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 405 may classify (e.g., cluster) the new observation in a cluster, as shown by reference number 420. The observations within a cluster may have a threshold degree of similarity. As an example, if the machine learning system classifies the new observation in a first cluster (e.g., a first cluster of transaction entries with a high probability of being associated with a first transaction), then the machine learning system may provide a first recommendation, such as a recommendation to mark the cluster of transaction entries as being associated with the same transaction, a recommendation to update a transaction record for the cluster of transaction entries (e.g., to have the same match identifier as one another), a recommendation to mark the transaction as reconciled, and/or the like. Additionally, or alternatively, the machine learning system may perform a first automated action and/or may cause a first automated action to be performed (e.g., by instructing another device to perform the automated action) based on classifying the new observation in the first cluster, such as marking the transaction entries in the cluster as being associated with the same transaction (e.g., by updating a data structure to assign the same match identifier to the cluster of transaction entries), marking the transaction as being reconciled, outputting information associated with the cluster of transaction entries (as described elsewhere herein), outputting a request for confirmation that transaction entries in the cluster of transaction entries are associated with the same transaction, retraining the machine learning model (e.g., based on receiving the confirmation), and/or the like.

In example 400, a cluster may represent a group of transaction entries that are likely associated with the same transaction, and different clusters may be associated with different transactions. In some implementations, the machine learning system may generate a cluster of transaction entries that were unable to be associated with a transaction. Alternatively, those transaction entries may not be associate with a cluster, and the machine learning system may provide output that indicates the clusters and/or the transaction entries that could not be clustered.

In this way, the machine learning system may apply a rigorous and automated process to transaction reconciliation. The machine learning system enables recognition and/or identification of tens, hundreds, thousands, or millions of features and/or feature values for tens, hundreds, thousands, or millions of observations, thereby increasing accuracy and consistency and reducing delay associated with transaction reconciliation relative to requiring computing resources to be allocated for tens, hundreds, or thousands of operators to manually reconcile transactions using the features or feature values.

As indicated above, FIG. 4 is provided as an example. Other examples may differ from what is described in connection with FIG. 4.

Figure 5:
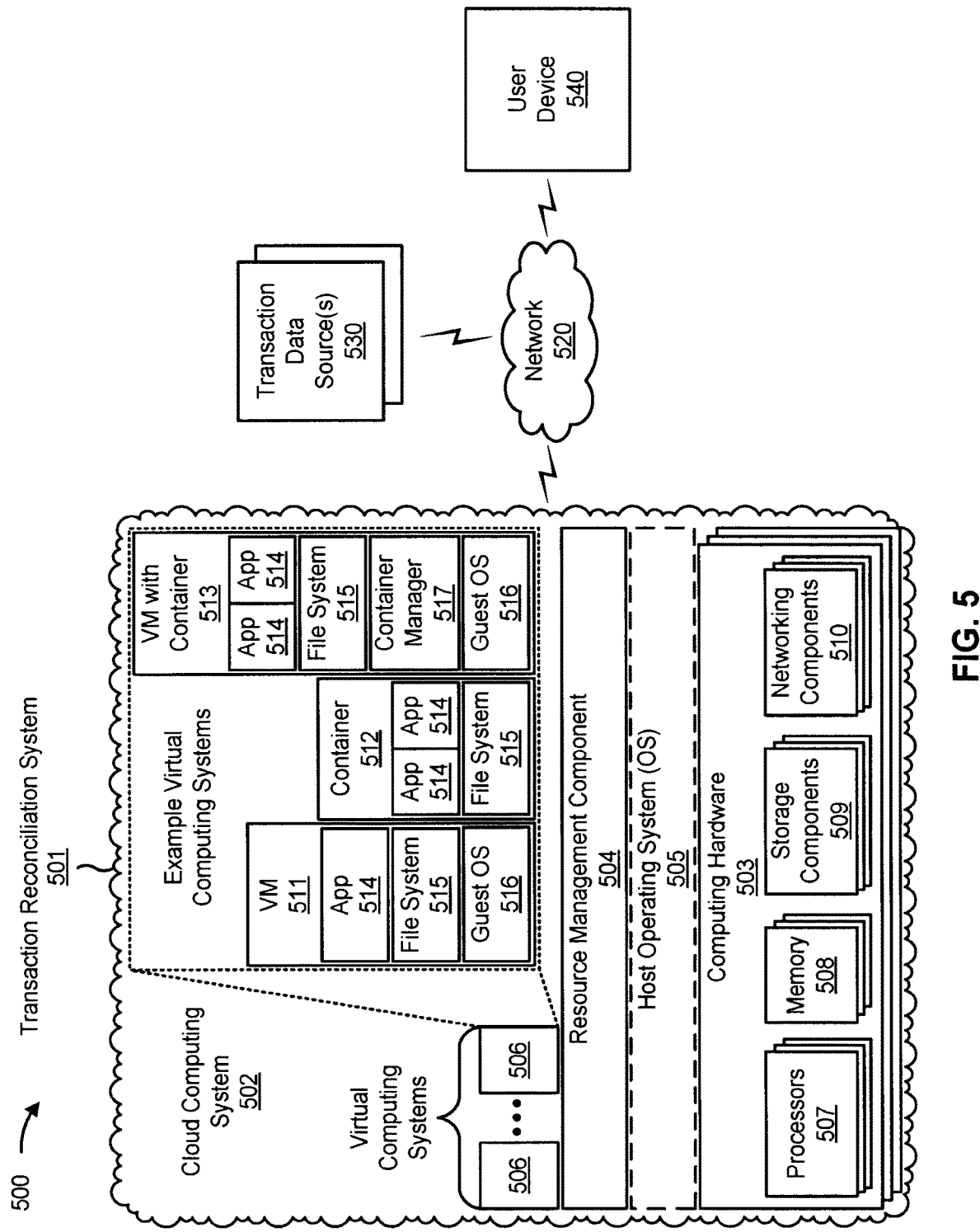
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a transaction reconciliation system 501. The transaction reconciliation system 501 may include one or more elements of a cloud computing system 502 and/or may execute within the cloud computing system 502 (e.g., as one or more virtual computing systems 506). The cloud computing system 502 may include one or more elements 503-517, as described in more detail below. As further shown in FIG. 5, environment 500 may include a network 520, one or more transaction data sources 530, and/or a user device 540. Devices of environment 500 may interconnect via wired connections, wireless connections, or a combination of wired and wireless connections.

The cloud computing system 502 includes computing hardware 503, a resource management component 504, a host operating system (OS) 505, and/or one or more virtual computing systems 506. The resource management component 504 may perform virtualization (e.g., abstraction) of computing hardware 503 to create the one or more virtual computing systems 506. Using such virtualization, the resource management component 504 enables a single computing device (e.g., a computer, a server, a host device, and/or the like) to operate as if the single computing device were multiple computing devices, such as by creating multiple isolated virtual computing systems 506 from computing hardware 503 of the single computing device. The multiple virtual computing systems 506 operate independently from one another and do not interact with one another. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server or host device) or from multiple computing devices (e.g., multiple servers or host devices), such as multiple computing devices in one or more data centers, server farms, server pools, and/or the like. As shown, computing hardware 503 may include one or more processors 507, one or more memories 508, one or more storage components 509, and/or one or more networking components 510. Computing hardware 503 may be interconnected via one or more wired and/or wireless buses, which may interconnect computing hardware 503 within a single computing device and/or across multiple computing devices.

A processor 507 includes a central processing unit, a graphics processing unit, and/or the like. A memory 508 includes random-access memory, read-only memory, and/or the like. The memory 508 may store a set of instructions (e.g., one or more instructions) for execution by the processor 507. The processor 507 may execute the set of instructions to perform one or more operations or processes described herein. In some implementations, execution of the set of instructions, by one or more processors 507, causes the one or more processors 507 and/or the transaction reconciliation system 501 to perform one or more operations or processes described herein. A storage component 509 includes a hard disk or another type of storage device that stores information, data, and/or software (e.g., code, instructions, and/or the like) related to the operation and use of the transaction reconciliation system 501. In some implementations, memory 508 and/or storage component 509 is/are implemented as a non-transitory computer readable medium. A networking component 510 includes a network interface and corresponding hardware that enables the transaction reconciliation system 501 to communicate with other devices of environment 500 via a wired connection and/or a wireless connection, such as via network 520. Additional examples of a processor, a memory, a storage component, and a networking component (e.g., a communication interface) are described elsewhere herein.

The resource management component 504 includes a virtualization application (e.g., executing on hardware, such as computing hardware 503) capable of virtualizing computing hardware 503 to start (e.g., create or spin up), stop (e.g., delete or tear down), and/or manage one or more virtual computing systems 506. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 504 may control access to and/or use of computing hardware 503 and/or software executing on computing hardware 503. Additionally, or alternatively, the resource management component 504 may perform binary rewriting to scan instructions received from a virtual computing system 506 and replace any privileged instructions with safe emulations of those instructions. The resource management component 504 may include a hypervisor or a virtual machine monitor, such as when the virtual computing systems 506 are virtual machines 511. Additionally, or alternatively, the resource management component 504 may include a container manager, such as when the virtual computing systems 506 are containers 512.

In some implementations, the resource management component 504 executes within and/or in coordination with a host operating system 505. For example, the resource management component 504 may execute on top of the host operating system 505 rather than interacting directly with computing hardware 503, such as when the resource management component 504 is a hosted hypervisor (e.g., a Type 2 hypervisor) or a container manager. In this case, the host operating system 505 may control access to and/or use of computing hardware 503 and/or software executing on computing hardware 503 based on information and/or instructions received from the resource management component 504. Alternatively, the resource management component 504 may interact directly with computing hardware 503 rather than interacting with the host operating system 505, such as when the resource management component 504 is a bare-metal hypervisor (e.g., a Type 1 hypervisor). Thus, in some implementations, the cloud computing system 502 does not include a host operating system 505. In some implementations, the host operating system 505 includes and/or executes an administrator application to enable a system administrator to manage, customize, and/or configure cloud computing system 502.

A virtual computing system 506 includes a virtual environment that enables cloud-based execution of operations and/or processes described herein using computing hardware 503. As shown, a virtual computing system 506 may include a virtual machine 511, a container 512, a hybrid environment 513 that includes a virtual machine and a container, and/or the like. A virtual computing system 506 may execute one or more applications 514 using a file system 515. The file system 515 may include binary files, software libraries, and/or other resources required to execute applications 514 on a guest operating system 516 or the host operating system 505. In some implementations, a virtual computing system 506 (e.g., a virtual machine 511 or a hybrid environment 513) includes a guest operating system 516. In some implementations, a virtual computing system 506 (e.g., a container 512 or a hybrid environment 513) includes a container manager 517.

A virtual machine 511 is an emulation of a computing device that enables execution of separate, isolated instances of virtual computing devices (e.g., multiple virtual machines 511) on the same computing hardware 503. The guest operating systems 516 and applications 514 of multiple virtual machines 511 may share computing hardware 503 from a single computing device or from multiple computing devices (e.g., a pool of computing devices). Each separate virtual machine 511 may include a guest operating system 516, a file system 515, and one or more applications 514. With a virtual machine 511, the underlying computing hardware 503 is virtualized, and the guest operating system 516 executes on top of this virtualized hardware. Using virtual machines 511 enables different types of guest operating systems 516 to execute on the same computing hardware 503 in an isolated environment, but with more resource usage and overhead than containers 512.

Unlike a virtual machine 511, a container 512 virtualizes a host operating system 505 rather than the underlying computing hardware 503. Thus, a container 512 does not require a guest operating system 516 because the application(s) 514 included in the container 512 execute directly on the host operating system 505 using a file system 515 included in the container 512. Each separate container 512 may share the kernel of the host operating system 505, and different applications 514 within a single container 512 may share a file system 515. This sharing of a file system 515 among multiple applications 514 reduces the need to reproduce operating system code for different applications, and enables a single host operating system 505 to execute multiple applications 514 and/or containers 512. As a result, containers 512 enable a greater quantity of applications 514 to execute on a smaller quantity of computing devices as compared to virtual machines 511.

A hybrid environment 513 includes elements of a virtual machine 511 and a container 512. For example, a hybrid environment 513 may include a guest operating system 516 that executes on top of virtualized hardware. A container manager 517 may execute on top of the guest operating system 516 to start, stop, and/or manage one or more containers within the hybrid environment 513. Using a hybrid environment 513 enables different types of guest operating systems 516 to execute on the same computing hardware 503 in an isolated environment, while also enabling lightweight containers to execute on top of the guest operating system 516.

The quantity of applications 514 shown in FIG. 5 as executing within each virtual computing system 506 is shown as an example, and a different quantity of applications 514 may execute within each virtual computing system. Furthermore, although the transaction reconciliation system 501 may include one or more elements 503-517 of the cloud computing system 502, may execute within the cloud computing system 502, and/or may be hosted within the cloud computing system 502, in some implementations, the transaction reconciliation system 501 may not be cloud-based (e.g., may be implemented outside of a cloud computing system) or may be partially cloud-based. For example, the transaction reconciliation system 501 may include one or more devices that are not part of the cloud computing system 502, such as device 600 of FIG. 6, which may include a standalone server or another type of computing device. The transaction reconciliation system 501 may perform one or more operations and/or processes described in more detail elsewhere herein.

Network 520 includes one or more wired and/or wireless networks. For example, network 520 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 520 enables communication among the devices of environment 500.

The transaction data source 530 includes one or more devices capable of receiving, generating, storing, processing, providing, and/or routing information associated with transaction reconciliation, as described elsewhere herein. The transaction data source 530 may include a communication device and/or a computing device. For example, the transaction data source 530 may include a database, a server, an application server, a client server, a web server, a database server, a host server, a proxy server, a virtual server (e.g., executing on computing hardware), a server in a cloud computing system, a device that includes computing hardware used in a cloud computing environment, or a similar type of device. The transaction data source 530 may communicate with one or more other devices of environment 500, as described elsewhere herein.

The user device 540 includes one or more devices capable of receiving, generating, storing, processing, and/or providing information associated with transaction reconciliation, as described elsewhere herein. The user device 540 may include a communication device and/or a computing device. For example, the user device 540 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 540 may communicate with one or more other devices of environment 500, as described elsewhere herein. For example, the user device 540 may receive information from the transaction reconciliation system 501 (e.g., information associated with a recommendation of the transaction reconciliation system 501 and/or an action performed by the transaction reconciliation system 501). The user device 540 may output the information for display. Additionally, or alternatively, the user device 540 may receive user input (e.g., based on the displayed information) and may provide the user input to the transaction reconciliation system 501.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
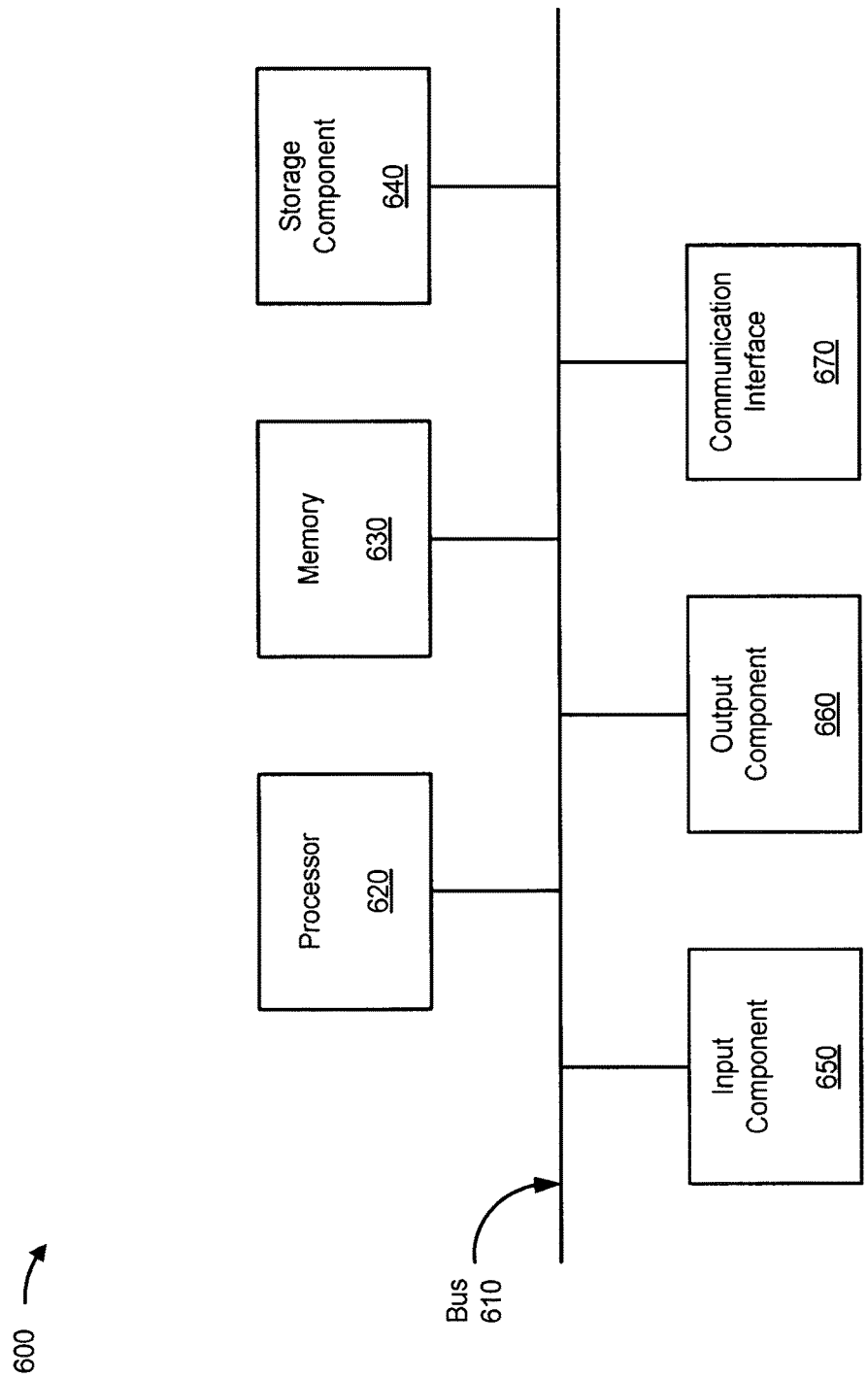
FIG. 6 is a diagram of example components of one or more devices of FIG. 6.

FIG. 6 is a diagram of example components of a device 600. Device 600 may correspond to transaction reconciliation system 501, transaction data source 530, and/or user device 540. In some implementations, transaction reconciliation system 501, transaction data source 530, and/or user device 540 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more LEDs).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, an RF interface, a universal serial bus (USB) interface, a wireless local area interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
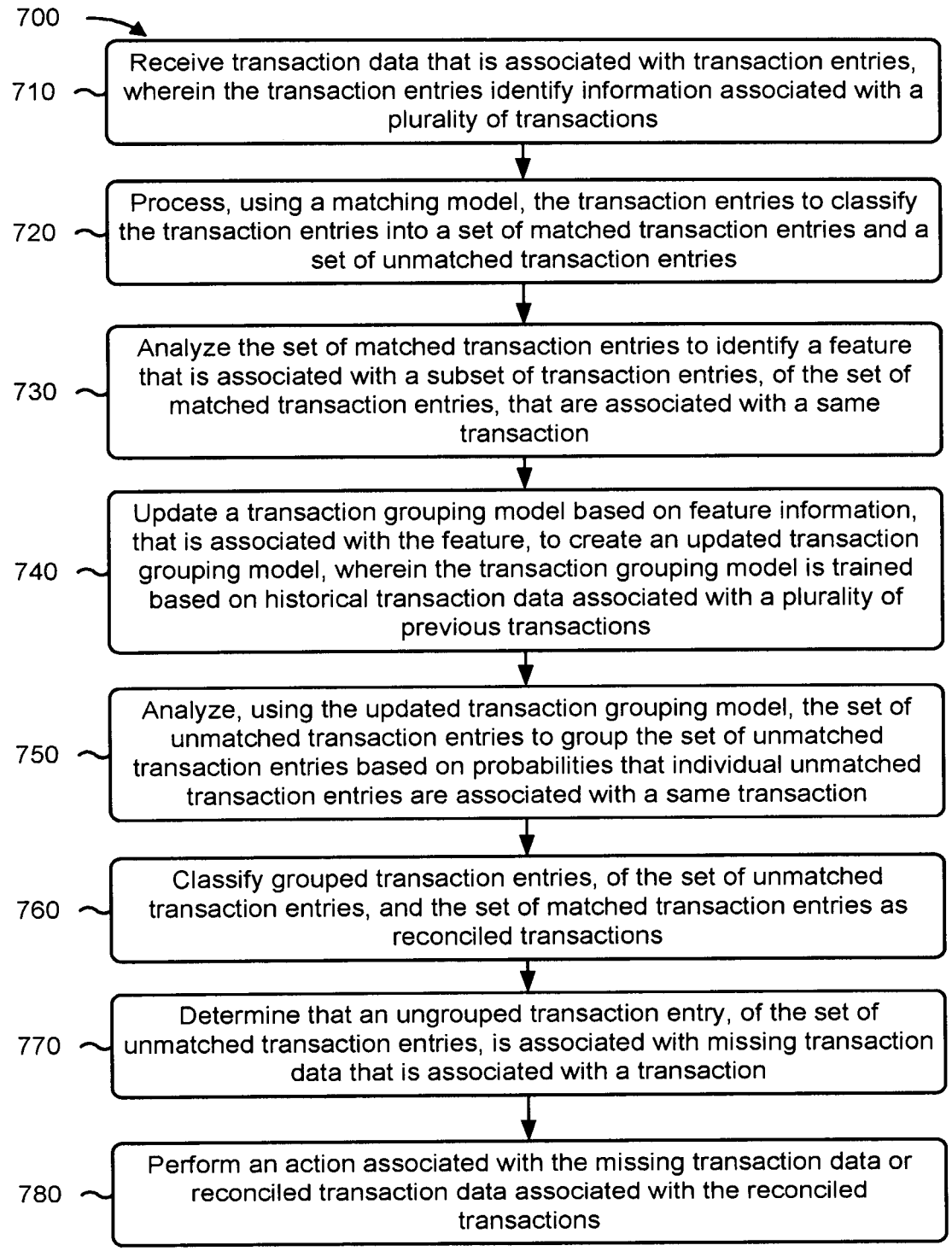
FIGS. 7-9 are flow charts of example processes relating to transaction reconciliation using machine learning.

FIG. 7 is a flow chart of an example process 700 associated with transaction reconciliation. In some implementations, one or more process blocks of FIG. 7 may be performed by a device (e.g., transaction reconciliation system 501, device 600, and/or the like). In some implementations, one or more process blocks of FIG. 7 may be performed by another device or a group of devices separate from or including the device, such as a transaction data source (e.g., transaction data source 530), a user device (e.g., user device 540), and/or the like. Additionally, or alternatively, one or more process blocks of FIG. 7 may be performed by one or more components of a device 600, such as processor 620, memory 630, storage component 640, input component 650, output component 660, communication interface 670, and/or the like.

As shown in FIG. 7, process 700 may include receiving transaction data that is associated with transaction entries, wherein the transaction entries identify information associated with a plurality of transactions (block 710). For example, the device may receive transaction data that is associated with transaction entries, as described above. In some implementations, the transaction entries identify information associated with a plurality of transactions.

As further shown in FIG. 7, process 700 may include processing, using a matching model, the transaction entries to classify the transaction entries into a set of matched transaction entries and a set of unmatched transaction entries (block 720). For example, the device may process, using a matching model, the transaction entries to classify the transaction entries into a set of matched transaction entries and a set of unmatched transaction entries, as described above.

As further shown in FIG. 7, process 700 may include analyzing the set of matched transaction entries to identify a feature that is associated with a subset of transaction entries, of the set of matched transaction entries, that are associated with a same transaction (block 730). For example, the device may analyze the set of matched transaction entries to identify a feature that is associated with a subset of transaction entries, of the set of matched transaction entries, that are associated with a same transaction, as described above.

As further shown in FIG. 7, process 700 may include updating a transaction grouping model based on feature information, that is associated with the feature, to create an updated transaction grouping model, wherein the transaction grouping model is trained based on historical transaction data associated with a plurality of previous transactions (block 740). For example, the device may update a transaction grouping model based on feature information, that is associated with the feature, to create an updated transaction grouping model, as described above. In some implementations, the transaction grouping model is trained based on historical transaction data associated with a plurality of previous transactions.

As further shown in FIG. 7, process 700 may include analyzing, using the updated transaction grouping model, the set of unmatched transaction entries to group the set of unmatched transaction entries based on probabilities that individual unmatched transaction entries are associated with a same transaction (block 750). For example, the device may analyze, using the updated transaction grouping model, the set of unmatched transaction entries to group the set of unmatched transaction entries based on probabilities that individual unmatched transaction entries are associated with a same transaction, as described above.

As further shown in FIG. 7, process 700 may include classifying grouped transaction entries, of the set of unmatched transaction entries, and the set of matched transaction entries as reconciled transactions (block 760). For example, the device may classify grouped transaction entries, of the set of unmatched transaction entries, and the set of matched transaction entries as reconciled transactions, as described above.

As further shown in FIG. 7, process 700 may include determining that an ungrouped transaction entry, of the set of unmatched transaction entries, is associated with missing transaction data that is associated with a transaction (block 770). For example, the device may determine that an ungrouped transaction entry, of the set of unmatched transaction entries, is associated with missing transaction data that is associated with a transaction, as described above.

As further shown in FIG. 7, process 700 may include performing an action associated with the missing transaction data or reconciled transaction data associated with the reconciled transactions (block 780). For example, the device may perform an action associated with the missing transaction data or reconciled transaction data associated with the reconciled transactions, as described above.

Process 700 may include additional implementations, such as any single implementation or any combination of implementations described below and/or in connection with one or more other processes described elsewhere herein.

In a first implementation, the set of matched transaction entries are labeled with match identifiers that are associated with corresponding transactions of the plurality of transactions, and analyzing the set of matched transaction entries comprises: identifying the subset of transaction entries based on a match identifier of the match identifiers, and determining that the feature is common to the subset of transaction entries.

In a second implementation, alone or in combination with the first implementation, analyzing the set of matched transaction entries comprises: concatenating transaction information, associated with pairs of transaction entries of the set of matched transaction entries, into sets of combined transaction information; generating a co-occurrence matrix based on the transaction information, and updating the transaction grouping model based on the co-occurrence matrix.

In a third implementation, alone or in combination with one or more of the first and second implementations, updating the transaction grouping model comprises: training the transaction grouping model based on the feature information to permit the transaction grouping model to identify the feature in the set of unmatched transaction entries or a subsequently identified set of unmatched transaction entries.

In a fourth implementation, alone or in combination with one or more of the first through third implementations, determining that the ungrouped transaction entry is associated with the missing transaction data comprises: determining, using an autoencoder, a first error metric associated with the grouped transaction entries; determining, using the autoencoder or a different autoencoder, a second error matric associated with the set of matched transaction entries; comparing the first error metric and the second error metric, and determining that the ungrouped transaction entry is associated with missing transaction data based on comparing the first error metric and the second error metric.

In a fifth implementation, alone or in combination with one or more of the first through fourth implementations, performing the action comprises: determining a characteristic associated with the missing transaction data, and outputting information that identifies the characteristic.

In a sixth implementation, alone or in combination with one or more of the first through fifth implementations, performing the action comprises: indicating that the plurality of transactions include the reconciled transactions and an unreconciled transaction that is associated with the ungrouped transaction entry and the missing transaction data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
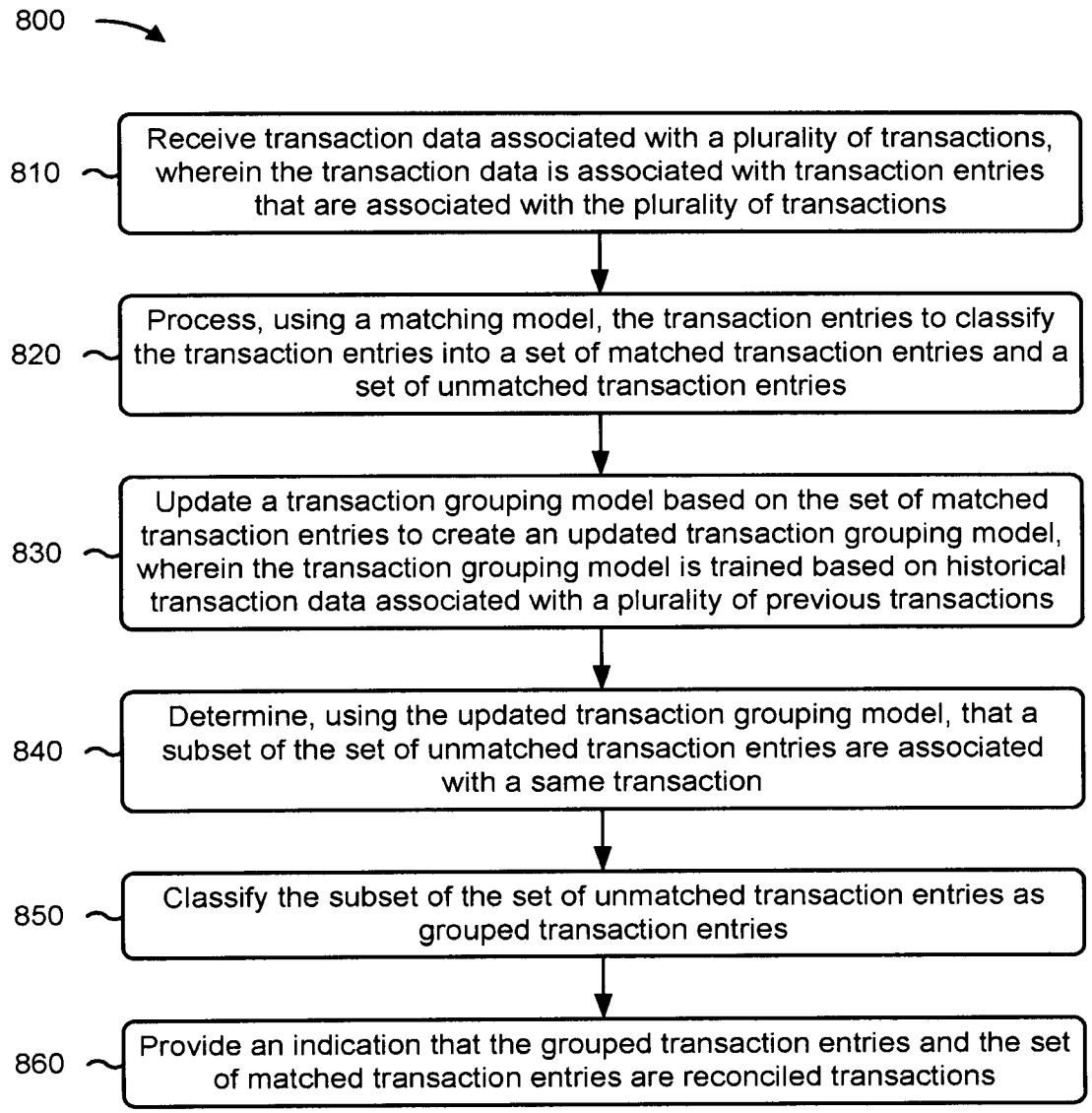

FIG. 8 is a flow chart of an example process 800 associated with transaction reconciliation. In some implementations, one or more process blocks of FIG. 8 may be performed by a device (e.g., transaction reconciliation system 501, device 600, and/or the like). In some implementations, one or more process blocks of FIG. 8 may be performed by another device or a group of devices separate from or including the device, such as a transaction data source (e.g., transaction data source 530), a user device (e.g., user device 540), and/or the like. Additionally, or alternatively, one or more process blocks of FIG. 8 may be performed by one or more components of a device 600, such as processor 620, memory 630, storage component 640, input component 650, output component 660, communication interface 670, and/or the like.

As shown in FIG. 8, process 800 may include receiving transaction data associated with a plurality of transactions, wherein the transaction data is associated with transaction entries that are associated with the plurality of transactions (block 810). For example, the device may receive transaction data associated with a plurality of transactions, as described above. In some implementations, the transaction data is associated with transaction entries that are associated with the plurality of transactions.

As further shown in FIG. 8, process 800 may include processing, using a matching model, the transaction entries to classify the transaction entries into a set of matched transaction entries and a set of unmatched transaction entries (block 820). For example, the device may process, using a matching model, the transaction entries to classify the transaction entries into a set of matched transaction entries and a set of unmatched transaction entries, as described above.

As further shown in FIG. 8, process 800 may include updating a transaction grouping model based on the set of matched transaction entries to create an updated transaction grouping model, wherein the transaction grouping model is trained based on historical transaction data associated with a plurality of previous transactions (block 830). For example, the device may update a transaction grouping model based on the set of matched transaction entries to create an updated transaction grouping model, as described above. In some implementations, the transaction grouping model is trained based on historical transaction data associated with a plurality of previous transactions.

As further shown in FIG. 8, process 800 may include determining, using the updated transaction grouping model, that a subset of the set of unmatched transaction entries are associated with a same transaction (block 840). For example, the device may determine, using the updated transaction grouping model, that a subset of the set of unmatched transaction entries are associated with a same transaction, as described above.

As further shown in FIG. 8, process 800 may include classifying the subset of the set of unmatched transaction entries as grouped transaction entries (block 850). For example, the device may classify the subset of the set of unmatched transaction entries as grouped transaction entries, as described above.

As further shown in FIG. 8, process 800 may include providing an indication that the grouped transaction entries and the set of matched transaction entries are reconciled transactions (block 860). For example, the device may provide an indication that the grouped transaction entries and the set of matched transaction entries are reconciled transactions, as described above.

Process 800 may include additional implementations, such as any single implementation or any combination of implementations described below and/or in connection with one or more other processes described elsewhere herein.

In a first implementation, the matching model is configured to determine the set of matched transaction entries based on at least one of: transaction values of the set of matched transaction entries, time associated with the set of matched transaction entries, or entity information associated with the set of matched transaction entries.

In a second implementation, alone or in combination with the first implementation, the set of matched transaction entries are labeled with match identifiers that are associated with corresponding transactions of the plurality of transactions, and analyzing the set of matched transaction entries comprises: identify a subset of transaction entries, of the set of matched transaction entries, based on the match identifiers; determine a feature that is common to the subset of transaction entries; generate feature information associated with the feature, and update the transaction grouping model based on the feature information.

In a third implementation, alone or in combination with one or more of the first and second implementations, process 800 includes identifying a feature that is associated with a pair of transaction entries of the set of matched transaction entries, and training the transaction grouping model based on feature information associated with the feature and the historical transaction data.

In a fourth implementation, alone or in combination with one or more of the first through third implementations, process 800 includes determining individual probabilities that pairs of individual unmatched transaction entries, of the subset of the set of unmatched transaction entries, are associated with the same transaction; determining that the individual probabilities satisfy a probability threshold; and determining, based on the individual probabilities satisfying the probability threshold, that the subset of the set of unmatched transaction entries are associated with the same transaction.

In a fifth implementation, alone or in combination with one or more of the first through fourth implementations, process 800 includes identifying, using the updated transaction grouping model, an ungrouped transaction entry of the set of unmatched transaction entries; determining that the ungrouped transaction entry is associated with missing transaction data; and providing information associated with the missing transaction data and the ungrouped transaction entry.

In a sixth implementation, alone or in combination with one or more of the first through fifth implementations, process 800 includes prompting, via a user interface of a user device, a user for confirmation of the reconciled transactions; receiving, from the user device, a response associated with the confirmation; and training the transaction grouping model based on the response.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
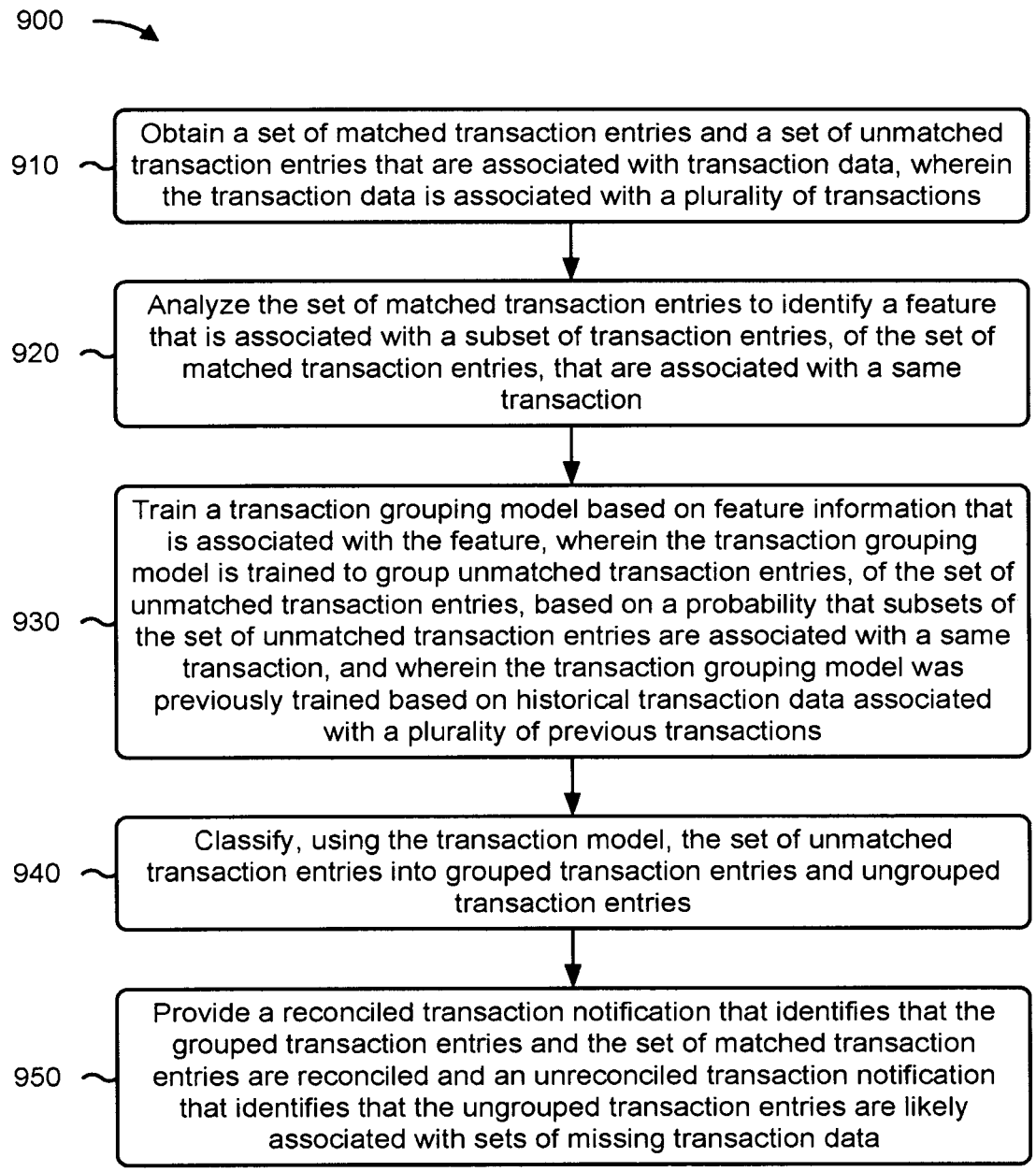

FIG. 9 is a flow chart of an example process 900 associated with transaction reconciliation. In some implementations, one or more process blocks of FIG. 9 may be performed by a device (e.g., transaction reconciliation system 501, device 600, and/or the like). In some implementations, one or more process blocks of FIG. 9 may be performed by another device or a group of devices separate from or including the device, such as a transaction data source (e.g., transaction data source 530), a user device (e.g., user device 540), and/or the like. Additionally, or alternatively, one or more process blocks of FIG. 9 may be performed by one or more components of a device 600, such as processor 620, memory 630, storage component 640, input component 650, output component 660, communication interface 670, and/or the like.

As shown in FIG. 9, process 900 may include obtaining a set of matched transaction entries and a set of unmatched transaction entries that are associated with transaction data, wherein the transaction data is associated with a plurality of transactions (block 910). For example, the device may obtain a set of matched transaction entries and a set of unmatched transaction entries that are associated with transaction data, as described above. In some implementations, the transaction data is associated with a plurality of transactions.

As further shown in FIG. 9, process 900 may include analyzing the set of matched transaction entries to identify a feature that is associated with a subset of transaction entries, of the set of matched transaction entries, that are associated with a same transaction (block 920). For example, the device may analyze the set of matched transaction entries to identify a feature that is associated with a subset of transaction entries, of the set of matched transaction entries, that are associated with a same transaction, as described above.

As further shown in FIG. 9, process 900 may include training a transaction grouping model based on feature information that is associated with the feature, wherein the transaction grouping model is trained to group unmatched transaction entries, of the set of unmatched transaction entries, based on a probability that subsets of the set of unmatched transaction entries are associated with a same transaction, and wherein the transaction grouping model was previously trained based on historical transaction data associated with a plurality of previous transactions (block 930). For example, the device may train a transaction grouping model based on feature information that is associated with the feature, as described above. In some implementations, the transaction grouping model is trained to group unmatched transaction entries, of the set of unmatched transaction entries, based on a probability that subsets of the set of unmatched transaction entries are associated with a same transaction. In some implementations, the transaction grouping model was previously trained based on historical transaction data associated with a plurality of previous transactions.

As further shown in FIG. 9, process 900 may include classifying, using the transaction model, the set of unmatched transaction entries into grouped transaction entries and ungrouped transaction entries (block 940). For example, the device may classify, using the transaction model, the set of unmatched transaction entries into grouped transaction entries and ungrouped transaction entries, as described above.

As further shown in FIG. 9, process 900 may include providing a reconciled transaction notification that identifies that the grouped transaction entries and the set of matched transaction entries are reconciled and an unreconciled transaction notification that identifies that the ungrouped transaction entries are likely associated with sets of missing transaction data (block 950). For example, the device may provide a reconciled transaction notification that identifies that the grouped transaction entries and the set of matched transaction entries are reconciled and an unreconciled transaction notification that identifies that the ungrouped transaction entries are likely associated with sets of missing transaction data, as described above.

Process 900 may include additional implementations, such as any single implementation or any combination of implementations described below and/or in connection with one or more other processes described elsewhere herein.

In a first implementation, the feature is identified based on the feature being included within a first transaction entry that is associated with a negative value and a second transaction entry that is associated with a positive value.

In a second implementation, alone or in combination with the first implementation, a magnitude of the negative value is different than a magnitude of the positive value.

In a third implementation, alone or in combination with one or more of the first and second implementations, the transaction grouping model includes a long short term memory (LSTM) network and a graphing model.

In a fourth implementation, alone or in combination with one or more of the first through third implementations, process 900 includes determining a characteristic of a particular set of missing transaction data of the sets of transaction data, and indicating that the characteristic of the particular set of missing transaction data is associated with a particular ungrouped transaction entry of the ungrouped transaction entries.

In a fifth implementation, alone or in combination with one or more of the first through fourth implementations, process 900 includes providing, to a user device, a request for user confirmation of the reconciled transaction notification and the unreconciled transaction notification; receiving, from the user device, a response associated with the request; and retraining the transaction grouping model based on the response.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, transaction data that is associated with transaction entries,
wherein the transaction entries identify information associated with a plurality of transactions;
classifying, by the device and using a machine learning model, the transaction entries into a set of matched transaction entries and a set of unmatched transaction entries;
combining, by the device, a first matched transaction entry, of the set of matched transaction entries, and a second matched transaction entry, of the set of matched transaction entries, into a first transaction pair;
labeling, by the device, the first transaction pair to indicate that the first matched transaction entry and the second matched transaction entry belong to a same transaction of the plurality of transactions;
combining, by the device, a third matched transaction entry, of the set of matched transaction entries, and a fourth matched transaction entry, of the set of matched transaction entries, into a second transaction pair;
labeling, by the device, the second transaction pair to indicate that the third matched transaction entry and the fourth matched transaction entry belong to a different transaction of the plurality of transactions;
identifying, by the device, a feature that is associated with a subset of matched transaction entries, of the set of matched transaction entries, that are associated with the same transaction, of the plurality of transactions;
generating, by the device, an updated machine learning model,
wherein the updated machine learning model is generated using feature information associated with the feature,
wherein the updated machine learning model is generated based on labeling the first transaction pair to indicate that the first matched transaction entry and the second matched transaction entry belong to the same transaction of the plurality of transactions,
wherein the updated machine learning model is generated based on labeling the second transaction pair to indicate that the third matched transaction entry and the fourth matched transaction entry belong to the different transaction of the plurality of transactions,
wherein the updated machine learning model is trained based on historical transaction data associated with a plurality of previous transactions;
grouping, by the device and using the updated machine learning model, the set of unmatched transaction entries based on probabilities that individual unmatched transaction entries are associated with the same transaction;
classifying, by the device, grouped transaction entries, of the set of unmatched transaction entries, and the set of matched transaction entries as reconciled transactions;
determining, by the device, that an ungrouped transaction entry, of the set of unmatched transaction entries, is associated with missing transaction data;
displaying, by the device and via a user interface, a request for confirmation of the reconciled transactions;
receiving, by the device and via the user interface, an input confirming the reconciled transactions or an input rejecting the reconciled transactions; and
selectively:
updating, by the device and based on receiving the input confirming the reconciled transactions, a data structure to mark the transactions as reconciled and to include predicted transaction data, and
prompting, by the device and based on receiving the input rejecting the reconciled transactions via the user interface, a user to input information that identifies the missing transaction data.

2. The method of claim 1, further comprising:
labeling the set of matched transaction entries with match identifiers that are associated with corresponding transactions of the plurality of transactions; and
wherein identifying the feature that is associated with the subset of matched transaction entries that are associated with the same transaction comprises:
identifying the subset of matched transaction entries based on a match identifier of the match identifiers.

3. The method of claim 1, wherein identifying the feature that is associated with the subset of matched transaction entries that are associated with the same transaction comprises:
combining transaction information, associated with pairs of transaction entries of the set of matched transaction entries, into sets of combined transaction information; and
generating a co-occurrence matrix based on the sets of combined transaction information; and
wherein generating the updated machine learning model comprises:
generating the updated machine learning model based on the co-occurrence matrix.

4. The method of claim 1, wherein generating the updated machine learning model comprises:
- training the updated machine learning model based on the feature information; and
- wherein the method further comprises:
    - identifying, based on training the updated machine learning model based on the feature information, the feature in the set of unmatched transaction entries or a subsequently identified set of unmatched transaction entries.

5. The method of claim 1, wherein determining that the ungrouped transaction entry, of the set of unmatched transaction entries, is associated with the missing transaction data comprises:
- determining, using an autoencoder, a first error metric associated with the grouped transaction entries;
- determining, using the autoencoder or a different autoencoder, a second error metric associated with the set of matched transaction entries;
- comparing the first error metric and the second error metric; and
- determining that the ungrouped transaction entry is associated with the missing transaction data based on comparing the first error metric and the second error metric.

6. The method of claim 1, further comprising:
- determining a characteristic associated with the missing transaction data; and
- outputting information that identifies the characteristic.

7. The method of claim 1, further comprising:
- indicating that the plurality of transactions include:
    - the reconciled transactions,
    - an unreconciled transaction that is associated with the ungrouped transaction entry, and
    - the missing transaction data.

8. A device, comprising:
- one or more memories; and
- one or more processors coupled to the one or more memories, configured to:
    - receive transaction data associated with a plurality of transactions,
        - wherein the transaction data is associated with transaction entries that are associated with the plurality of transactions;
    - classify, using a machine learning model, the transaction entries into a set of matched transaction entries and a set of unmatched transaction entries;
    - combine a first matched transaction entry, of the set of matched transaction entries, and a second matched transaction entry, of the set of matched transaction entries, into a first transaction pair;
    - label the first transaction pair to indicate that the first matched transaction entry and the second matched transaction entry belong to a same transaction of the plurality of transactions;
    - combine a third matched transaction entry, of the set of matched transaction entries, and a fourth matched transaction entry, of the set of matched transaction entries, into a second transaction pair;
    - label the second transaction pair to indicate that the third matched transaction entry and the fourth matched transaction entry belong to a different transaction of the plurality of transactions;
    - generate an updated machine learning model based on the set of matched transaction entries,
        - wherein the updated machine learning model is generated based on labeling the first transaction pair to indicate that the first matched transaction entry and the second matched transaction entry belong to the same transaction of the plurality of transactions,
        - wherein the updated machine learning model is generated based on labeling the second transaction pair to indicate that the third matched transaction entry and the fourth matched transaction entry belong to the different transaction of the plurality of transactions
            - wherein the updated machine learning model is trained based on historical transaction data associated with a plurality of previous transactions;
    - determine, using the updated machine learning model, that a subset of the set of unmatched transaction entries are associated with the same transaction;
    - classify the subset of the set of unmatched transaction entries as grouped transaction entries;
    - provide an indication that the grouped transaction entries and the set of matched transaction entries are reconciled transactions;
    - display, via a user interface, a request for confirmation of the reconciled transactions;
    - receive, via the user interface, an input confirming the reconciled transactions or an input rejecting the reconciled transactions; and
    - selectively:
        - update, based on receiving the input confirming the reconciled transactions, a data structure to mark the transactions as reconciled and to include predicted transaction data, and
        - prompt, based on receiving the input rejecting the reconciled transactions via the user interface, a user to input information that identifies missing transaction data.

9. The device of claim 8, wherein the machine learning model classifies the transaction entries into the set of matched transaction entries and the set of unmatched transaction entries based on at least one of:
- transaction values of the set of matched transaction entries,
- time associated with the set of matched transaction entries, or
- entity information associated with the set of matched transaction entries.

10. The device of claim 8, wherein the one or more processors are further configured to:
- label the set of matched transaction entries with match identifiers that are associated with corresponding transactions of the plurality of transactions;
- identify a subset of matched transaction entries, of the set of matched transaction entries, based on the match identifiers;
- determine a feature associated with the subset of matched transaction entries, of the set of matched transaction entries, that corresponds to the same transaction; and
- generate feature information associated with the feature; and
- wherein the one or more processors, to generate the updated machine learning model, are to:
    - generate the updated machine learning model based on the feature information.

11. The device of claim 8, wherein the one or more processors, prior to generating the updated machine learning model, are further configured to:
- identify a feature that is associated with the first transaction pair and the second transaction pair; and train the machine learning model based on feature information associated with the feature and the historical transaction data.

12. The device of claim 8, wherein the one or more processors, to determine that the subset of the set of unmatched transaction entries are associated with the same transaction, are configured to:
   determine individual probabilities that pairs of individual unmatched transaction entries, of the subset of the set of unmatched transaction entries, are associated with the same transaction;
   determine that the individual probabilities satisfy a probability threshold; and
   determine, based on the individual probabilities satisfying the probability threshold, that the subset of the set of unmatched transaction entries are associated with the same transaction.

13. The device of claim 8, wherein the one or more processors are further configured to:
   identify, using the updated machine learning model, an ungrouped transaction entry of the set of unmatched transaction entries;
   determine that the ungrouped transaction entry is associated with the missing transaction data; and
   provide information associated with the missing transaction data and the ungrouped transaction entry.

14. The device of claim 8, wherein the one or more processors are further configured to:
   train the updated machine learning model based on the input information that identifies the missing transaction data.

15. A non-transitory computer-readable medium storing instructions, the instructions comprising:
   one or more instructions that, when executed by one or more processors, cause the one or more processors to:
      obtain a set of matched transaction entries and a set of unmatched transaction entries that are associated with transaction data,
         wherein the transaction data is associated with a plurality of transactions;
      combine a first matched transaction entry, of the set of matched transaction entries, and a second matched transaction entry, of the set of matched transaction entries, into a first transaction pair;
      label the first transaction pair to indicate that the first matched transaction entry and the second matched transaction entry belong to a same transaction of the plurality of transactions;
      combine a third matched transaction entry, of the set of matched transaction entries, and a fourth matched transaction entry, of the set of matched transaction entries, into a second transaction pair;
      label the second transaction pair to indicate that the third matched transaction entry and the fourth matched transaction entry belong to a different transaction of the plurality of transactions;
      identify a feature that is associated with a subset of matched transaction entries, of the set of matched transaction entries, that are associated with a same transaction, of the plurality of transactions;
      train a machine learning model based on feature information that is associated with the feature,
         wherein the machine learning model groups unmatched transaction entries, of the set of unmatched transaction entries, based on a probability that subsets of the set of unmatched transaction entries are associated with the same transaction,
         wherein the machine learning model was previously trained based on historical transaction data associated with a plurality of previous transactions;
      generate an updated machine learning model,
         wherein the updated machine learning model is generated based on labeling the first transaction pair to indicate that the first matched transaction entry and the second matched transaction entry belong to the same transaction of the plurality of transactions, and
         wherein the updated machine learning model is generated based on labeling the second transaction pair to indicate that the third matched transaction entry and the fourth matched transaction entry belong to the different transaction of the plurality of transactions;
      classify, using the updated machine learning model, the set of unmatched transaction entries into grouped transaction entries and ungrouped transaction entries;
      provide a reconciled transaction notification that identifies that the grouped transaction entries and the set of matched transaction entries are reconciled and an unreconciled transaction notification that identifies that the ungrouped transaction entries are likely associated with sets of missing transaction data;
      display, via a user interface, a request for confirmation of reconciled transactions;
      receive, via the user interface, an input confirming the reconciled transactions or an input rejecting the reconciled transactions; and
      selectively:
         update, based on receiving the input confirming the reconciled transactions, a data structure to mark the transactions as reconciled and to include predicted transaction data, and
         prompt, based on receiving the input rejecting the reconciled transactions via the user interface, a user to input information that identifies missing transaction data.

16. The non-transitory computer-readable medium of claim 15, wherein the feature is identified based on the feature being included within a first transaction entry that is associated with a negative value and a second transaction entry that is associated with a positive value.

17. The non-transitory computer-readable medium of claim 16, wherein a magnitude of the negative value is different than a magnitude of the positive value.

18. The non-transitory computer-readable medium of claim 15, wherein the machine learning model includes a long short term memory (LSTM) network and a graphing model.

19. The non-transitory computer-readable medium of claim 15, wherein the one or more instructions, when executed by the one or more processors, further cause the one or more processors to:
   determine a characteristic of a particular set of missing transaction data of the sets of missing transaction data; and
   wherein the one or more instructions, that cause the one or more processors to provide the unreconciled transaction notification, further cause the one or more processors to:

indicate that the characteristic of the particular set of missing transaction data is associated with a particular ungrouped transaction entry of the ungrouped transaction entries.

20. The non-transitory computer-readable medium of claim 15, wherein the one or more instructions, when executed by the one or more processors, further cause the one or more processors to:
retrain the updated machine learning model based on the input information that identifies the missing transaction data.

* * * * *